United States Patent
Lee et al.

(10) Patent No.: US 11,692,701 B2
(45) Date of Patent: Jul. 4, 2023

(54) OPTICAL BARRIER USING SIDE FILL AND LIGHT SOURCE MODULE INCLUDING THE SAME

(71) Applicant: Namuga Co., Ltd., Gyeonggi-do (KR)

(72) Inventors: Jun Youb Lee, Gyeonggi-do (KR); Young Gyu Kang, Gyeonggi-do (KR); Tae Youn Won, Gyeonggi-do (KR)

(73) Assignee: NAMUGA, CO., LTD., Gyeonggi-do (KR)

( * ) Notice: Subject to any disclaimer, the term of this patent is extended or adjusted under 35 U.S.C. 154(b) by 0 days.

(21) Appl. No.: 17/446,489

(22) Filed: Aug. 31, 2021

(65) Prior Publication Data
US 2023/0040923 A1    Feb. 9, 2023

(30) Foreign Application Priority Data

Aug. 6, 2021   (KR) .................. 10-2021-0103774

(51) Int. Cl.
*F21V 31/04*     (2006.01)
*F21V 11/00*     (2015.01)
*F21V 5/04*      (2006.01)

(52) U.S. Cl.
CPC ............... *F21V 31/04* (2013.01); *F21V 5/04* (2013.01); *F21V 11/00* (2013.01)

(58) Field of Classification Search
CPC .... F21V 5/04; F21V 11/00–186; F21V 31/04; G02F 1/133607–133615
See application file for complete search history.

(56) References Cited

U.S. PATENT DOCUMENTS

| | | | |
|---|---|---|---|
| 9,746,557 B2 * | 8/2017 | Camarri | H05K 1/0274 |
| 10,705,192 B2 | 7/2020 | Kubacki et al. | |
| 10,963,667 B2 | 3/2021 | Guo | |
| 2007/0272882 A1 * | 11/2007 | Ishihara | G01S 7/497 |
| | | | 250/559.36 |
| 2018/0190629 A1 * | 7/2018 | Hsu | H01L 31/0203 |

FOREIGN PATENT DOCUMENTS

| KR | 2019-0126807 A | 11/2019 |
|---|---|---|
| KR | 2020-0117187 A | 10/2020 |

* cited by examiner

*Primary Examiner* — Jason M Han
(74) *Attorney, Agent, or Firm* — FisherBroyles, LLP; Susan M. Oiler

(57) ABSTRACT

A light source module includes a substrate; a light source disposed on the substrate; a lens assembly configured to transmit light transferred from the light source; and an optical barrier having a shape which surrounds the light source to block light transferred from the light source.

8 Claims, 28 Drawing Sheets

300

*FIG. 14*
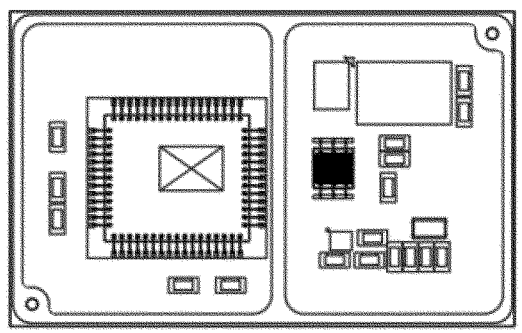
300 A
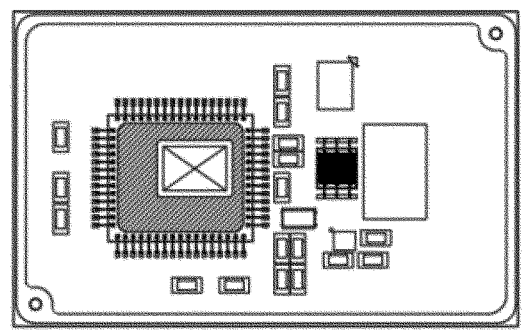
300 B

400

500

OPTICAL BARRIER USING SIDE FILL AND LIGHT SOURCE MODULE INCLUDING THE SAME

CROSS REFERENCE TO RELATED APPLICATION

This application claims priority from Republic of Korea Patent Application No. 10-2021-0103774, filed on Aug. 6, 2021, which is hereby incorporated by reference in its entirety.

BACKGROUND

1. Field of Technology

The present disclosure relates to an optical barrier using a side fill and a light source module including the same, and more particularly, to an optical barrier structure capable of reducing or blocking light transferred from a light source and a light source module including the same.

2. Description of the Prior Art

As methods for grasping 3D distance or depth distance information of an object, a stereo vision technique, a structured light technique and a time-of-flight technique are typically used.

Among them, the time-of-flight (TOF) technique is a technique of measuring a distance by repeatedly generating a laser with a constant pulse and calculating an arrival time of the pulse returned by being reflected by an object. Like the structured light technique, the time-of-flight technique requires a projector for scanning a beam onto the object. There are a direct measurement method of directly calculating a time for a pulse emitted from a transmitter to return to a receiver by being reflected on an object and an indirect measurement method of calculating a phase difference of a received pulse. The indirect measurement method is widely used.

Among the above-described methods for grasping 3D information, the structured light technique and the time-of-flight technique additionally perform, unlike the stereo vision technique, a process of scanning a beam, emitted from a transmitter, onto an object, and thus, are configured to include a light source. In addition, optical devices are used to emit a beam at a constant angle so as to cause light sent out from the light source to properly arrive at the object. As the optical devices, a lens, a diffuser, a prism, a beam splitter and so forth are widely used. By using various optical devices including these optical devices, an angle and direction of a beam may be appropriately adjusted.

As a device, such as a smartphone and a tablet, using a light source module for acquiring image data or distance data of an object is miniaturized, technical solutions for reducing the size of the light source module have been proposed. The miniaturization of the light source module is attempted by integrating a transmitter and a receiver of the light source module into one structure.

However, as the transmitter and the receiver of the light source module are integrated, light emitted from the transmitter is likely to be transferred to the receiver due to an internal diffuse reflection, etc., which may act as noise in a distance measurement process of an optical sensor of the receiver and may serve as a factor that decreases the accuracy of data.

Also, the transmitter and the receiver of the light source module may include at least one optical device and include a processor, metal wires, etc. Thus, the degree of difficulty to design a structure which effectively blocks the light of a light source sharply increases due to spatial limitations in the light source module.

Further, when the light source module is implemented in a system-in-package (SiP) type, the distance between the transmitter and the receiver decreases, and thus, an influence imposed on a distance measurement by optical noise increases. When one optical device is used by both the transmitter and the receiver in the system-in-package type light source module, a structure and a device for more effectively preventing a phenomenon in which light emitted from the transmitter is transferred to the receiver through leakage or reflection are required.

SUMMARY

Under such a background, in one aspect, various embodiments are directed to providing an optical barrier structure which may be disposed in a transmitter or a receiver of a light source module in order to effectively block light in the transmitter and the receiver of the light source module, and a light source module including the same.

In another aspect, various embodiments are directed to providing a light source module including an optical barrier capable of reducing optical noise generated in the light source module and a side fill capable of increasing the light blocking effect of the optical barrier.

In still another aspect, various embodiments are directed to providing a side fill capable of preventing a functional failure and providing structural stability of an optical barrier in a conventional light source module, and a light source module including the same.

In yet another aspect, various embodiments are directed to providing a structure capable of reducing optical noise even when a light source and an optical sensor are close to each other when a light source module is implemented in a system-in-package (SiP) type, and a light source module including the same.

In one aspect, an embodiment may provide a light source module including: a substrate; a light source disposed on the substrate; a lens assembly configured to transmit light transferred from the light source; and an optical barrier which surrounds the light source to block light transferred from the light source.

The optical barrier may be disposed on the substrate and may protrudes from the substrate. A height of the optical barrier may be higher than a height of the light source.

The optical barrier may be disposed to be spaced from the light source by a predetermined distance so as not to be in contact with metal wires of the light source, and may be brought into contact with the lens assembly.

The light source module may further include: a side fill formed by applying and curing a liquid material such that wires, which bring the light source and the substrate into electrical contact with each other, are immersed.

The side fill may include a material which blocks light of a predetermined wavelength band among light transferred from the light source.

In another aspect, an embodiment may provide a light source module including: a substrate; an optical sensor disposed on the substrate, and configured to receive light transferred from a light source; a lens assembly configured to transmit light, transferred from the light source, so as to transfer the light to the optical sensor; and an optical barrier configured to block light transferred from the light source.

The optical barrier may be disposed on the substrate to surround a periphery of the optical sensor.

The optical barrier may be disposed on an open surface of the optical sensor and may be brought into contact with the lens assembly.

The light source module may further include: a side fill formed by applying and curing a liquid material such that wires, which bring the optical sensor and the substrate into electrical contact with each other, are immersed.

The optical barrier may be installed on a surface on which the optical sensor and the substrate are not in contact with each other, and partial surfaces of the optical barrier and the optical sensor may block light, transferred from the light source, by being in contact with a side fill which is formed by a polymer being cured.

A light transmission layer may be formed between the optical barrier and the optical sensor, and a side fill, which blocks light of a predetermined wavelength band, may be applied to a path through which light is transferred to the light transmission layer.

The optical barrier may be disposed on an upper part of the optical sensor, wherein a predetermined distance is formed between the substrate and a top end of the optical barrier. A light blocking material, which may be cured, is disposed against the substrate, the optical sensor, and the optical barrier to have a distance less than the distance from the substrate to the top of the optical barrier and a thickness that gradually increases.

An outer side surface of the optical barrier and an outer side surface of the optical sensor with respect to an optical axis of the optical sensor may be coated with a light blocking material.

A blocking sheet may additionally be attached to a surface of the optical sensor.

A blocking sheet may additionally be attached between the optical sensor and the substrate and the blocking sheet may cover a metal pattern on a surface of the substrate.

The light source module may further include: a first blocking sheet attached to a first surface of the substrate; and a second blocking sheet attached to a surface opposite to the first surface of the substrate.

In still another aspect, an embodiment may provide a light source module including: a substrate; a light source disposed on the substrate and configured to emit light; an optical device configured to transmit light transferred from the light source; and an optical sensor disposed on the substrate and configured to receive light transferred from the light source, wherein the optical device comprises an optical barrier, which blocks light transferred from the light source, in one area of the optical device.

The optical barrier may be formed as a light blocking material is formed by a light blocking material being applied and cured in a hole which is formed in the optical device.

The optical barrier may be a light blocking barrier formed by a patterning on a surface of the optical device.

The optical barrier may include a blocking filter which blocks light of a predetermined wavelength band among light transferred from the light source.

As is apparent from the above, according to the embodiments, without increasing the size of a light source module, it is possible to reduce optical noise due to leakage light or reflection light transferred from a light source of the light source module and to improve the accuracy of image or distance measurement.

According to the embodiments, it is possible to solve a diffuse reflection phenomenon occurring inside a light source module which is formed in a metal wire bonding type and to prevent a light leakage phenomenon by a glass in the light source module.

According to the embodiments, while using one optical device in a light source module manufactured in a system-in-package type, it is possible to more effectively prevent a crosstalk phenomenon.

According to the embodiments, it is possible to solve problems caused due to a functional failure and structural instability of an optical sensor that occurs due to the formation of a side fill without using an optical barrier in the conventional art, and to provide a double light blocking effect by an optical barrier and a side fill.

BRIEF DESCRIPTION OF THE DRAWINGS

FIG. 14 is a view explaining the disposition of components of the light source module in accordance with the embodiment.

DETAILED DESCRIPTION OF THE EXEMPLARY EMBODIMENTS

Figure 1:
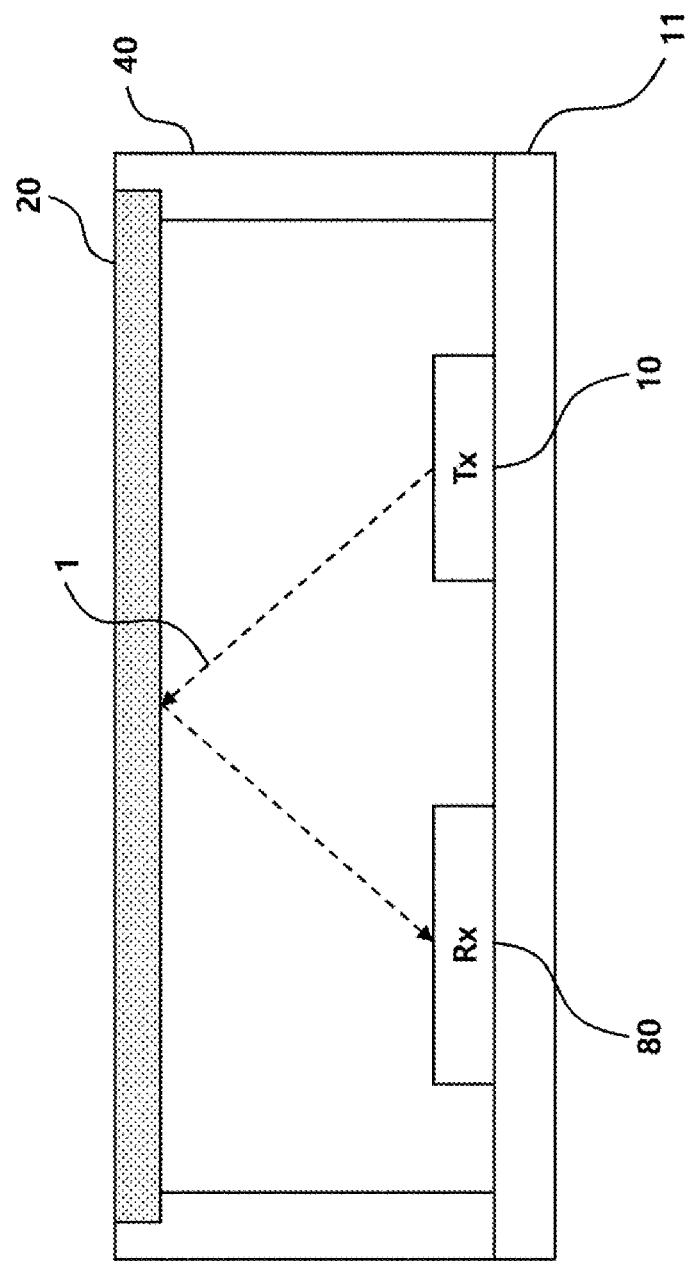
FIG. 1 is a view explaining a path of internal reflection light generated in a conventional light source module.

FIG. 1 is a view explaining a path of internal reflection light generated in a conventional light source module.

Referring to FIG. 1, the light source module may include a light source 10, a substrate 11, an optical device 20, a frame 40 and an optical sensor 80.

The light source 10 may be disposed on the substrate 11 and may output light. The anode electrode of the light source 10 may be connected to the anode wiring of the substrate 11, and the cathode electrode of the light source 10 may be connected to the cathode wiring of the substrate 11.

The light source 10 may be disposed on the substrate 11 by being connected in the form of wire bonding. Alternatively, the light source 10 may be disposed on the substrate 11 in the form of flip chip bonding without using wires. When the light source 10 is connected to the substrate 11 through flip chip bonding, wires are not needed, and accordingly, a more miniaturized distance measurement device may be configured.

The light source 10 is not limited as long as it is a light source capable of outputting light such as a laser. The light source 10 may include a vertical-cavity surface-emitting laser (VCSEL), a light emitting diode (LED), or the like.

The substrate 11 may support the light source 10. Wirings may be patterned in the substrate 11. The substrate 11 may be supplied with power from the outside, and may supply power to the light source 10 and so forth through the respective wirings.

The optical device 20 may reduce the intensity of the light outputted to a predetermined space, with respect to the light outputted from the light source 10, and may transmit the outputted light. For example, the optical device 20 may diffuse light so that an area at which the light arrives becomes wider, and thus, the intensity of light supplied to a unit area may be decreased.

The optical device 20 may include a device for decreasing the intensity of light by diffusing light, such as a diffuser, a diffractive optical element (DOE), a micro lens array (MLA) and a Fresnel lens, and may include a lens or a prism capable of changing an optical path or a light emission angle.

The optical device 20 may be the entirety or a part of a cover (not illustrated) which is supported by the frame 40. As illustrated in FIG. 1, the entire area supported by the frame 40 may be defined as the optical device 20. However, the optical device 20 may be disposed or formed in only an area corresponding to the light source 10 and an area corresponding to the optical sensor 80.

As long as the optical device 20 is supported by the frame 40, the optical device 20 may be in a form separated from the frame 40 or a form integrated with the frame 40. Depending on the shape of the frame 40, the position, structure and shape of the optical device 20 may variously defined.

The frame 40 may be disposed on the substrate 11, and may support the optical device 20 to separate the optical device 20 by a predetermined distance from the light source 10. The frame 40 may isolate the internal space and the external space of the light source module, and may serve to protect internal components from changes in external environment.

The optical sensor 80 may be disposed on the substrate 11, and may receive light. The optical sensor 80 may sense light which is received as light emitted from the light source 10 is reflected from a subject, or may sense light which is reflected inside the light source module.

The optical sensor 80 may be an image sensor. For example, the optical sensor 80 may be a photodiode (PD), a charge coupled device (CCD) or a complementary metal oxide semiconductor (CMOS). The optical sensor 80 may be a device capable of sensing light, such as a photodetector (PD).

If necessary, the entirety or a part of a transmitter of the light source module may include the light source 10, and the entirety or a part of a receiver of the light source module may include the optical sensor 80.

The light source module may include the transmitter and the receiver in one package. Due to this fact, light 1 which is not transferred from the transmitter of the light source module to the outside is transferred, directly or by being reflected inside the light source module, to the receiver of the light source module, and thereby, generates noise.

The noise may be caused by light measured inside or outside the light source module, other than light of the subject to be measured by the optical sensor 80.

Figure 2:
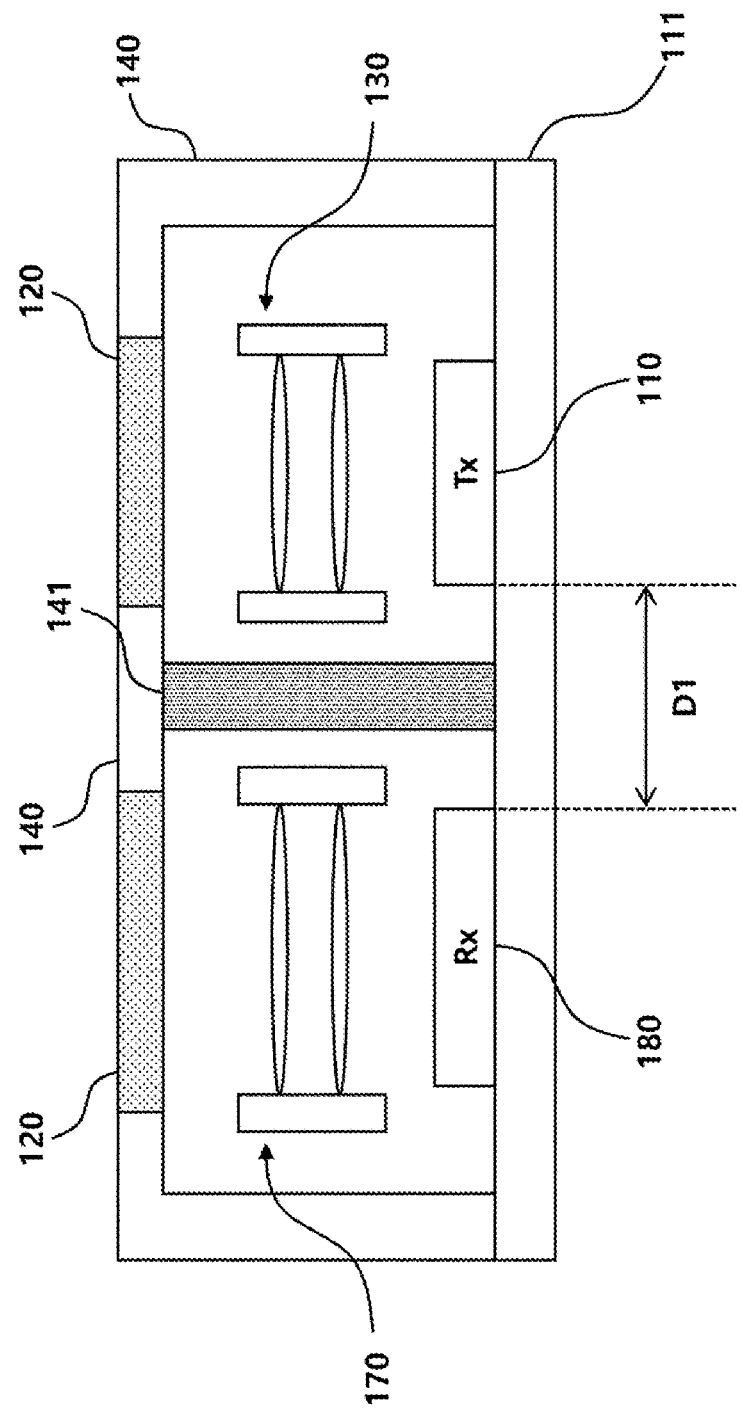
FIG. 2 is a view for explaining an optical barrier of a light source module in accordance with an embodiment.

FIG. 2 is a view for explaining an optical barrier of a light source module in accordance with an embodiment.

Referring to FIG. 2, a light source module 100 may include a light source 110, a substrate 111, an optical device 120, a transmitter lens structure 130, a frame 140, an optical barrier 141, a receiver lens structure 170 and an optical sensor 180.

The light source 110, the substrate 111, the optical device 120, the frame 140 and the optical sensor 180 illustrated in FIG. 2 may perform the same or similar functions as those of the light source module described above with reference to FIG. 1.

The optical device 120 may be omitted depending on the type of the lens structures 130 and 170, or may be locally disposed for only a partial area on the basis of the optical axis of each of the transmitter lens structure 130 and the receiver lens structure 170 by reflecting the characteristics of each of the transmitter lens structure 130 and the receiver lens structure 170.

Each of the transmitter lens structure 130 and the receiver lens structure 170 may be a set of one or more optical devices, for example, lenses. Each of the transmitter lens structure 130 and the receiver lens structure 170 may form a movable or fixed structure by supporting or coupling one or more optical devices, and due to this fact, can not help but limit the internal space of the light source module 100.

The optical barrier 141 may be disposed between the light source 110 and the optical sensor 180, and thereby, may block light emitted from the light source 110 from being transferred to the optical sensor 180.

The optical barrier 141 may be a structure which physically blocks light, but is not limited thereto as long as the optical barrier 141 is a structure or a material which serves to optically block light. The term optical barrier may be defined as an optical cover, an optical frame or the like as long as the optical barrier means a structure which reduces or blocks the intensity of light, and may be a part of the frame 140 or a separate structure separated from the frame 140.

The optical barrier 141 may be disposed at an optional position within a distance D1 between one end of the light source 110 and one end of the optical sensor 180.

The optical barrier 141 may be designed to correspond to the length between the substrate 111 and the optical device 120 or the cover (not illustrated), and thereby, may serve to spatially separate a transmitter and a receiver of the light source module 100. In this case, the optical barrier 141 may form two sealed spaces and thereby prevent light from passing through each space, whereby it is possible to solve a noise phenomenon by leakage light or reflection light arriving at the optical sensor 180.

The optical barrier 141, as a structure extending from the frame 140, may be a structure which is connected to the frame 140.

Figure 3:
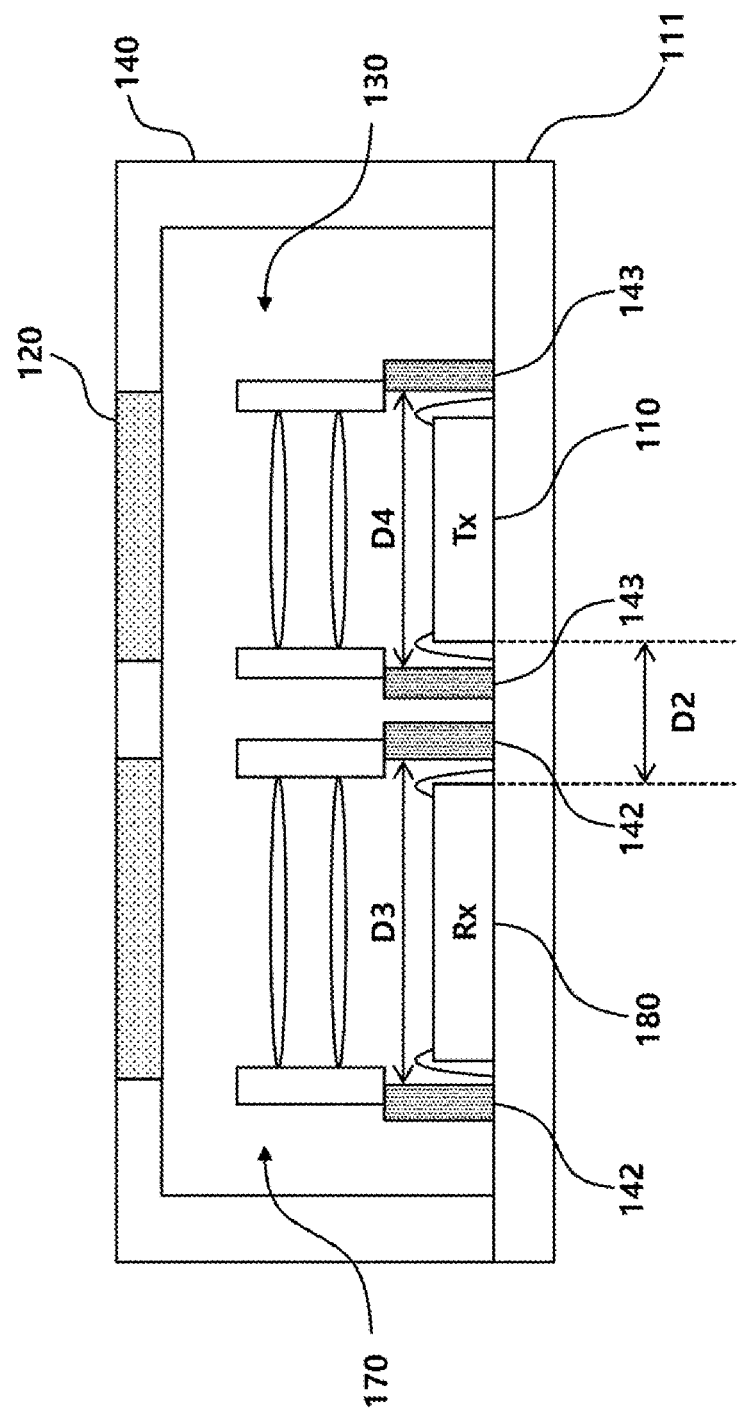
FIG. 3 is a view for explaining an optical barrier of a light source module in accordance with an embodiment.

FIG. 3 is a view for explaining an optical barrier of a light source module in accordance with an embodiment.

Referring to FIG. 3, a light source module 100 may include a transmitter lens structure 130, a first optical barrier 142, a second optical barrier 143 and a receiver lens structure 170.

The first optical barrier 142 may be a structure which is installed or disposed around the optical sensor 180 to limit a direction or an area of light transferred to the optical sensor 180.

The second optical barrier 143 may be a structure which is installed or disposed around the light source 110 to limit a direction or an area of light transferred to the optical sensor 180.

The first optical barrier 142 may be disposed on the substrate 111 to surround the optical sensor 180. The optical sensor 180 may be connected to the substrate 111 in the form of flip chip bonding or in the form of wire bonding. When the optical sensor 180 is connected to the substrate 111 in the form of wire bonding, the first optical barrier 142 may be disposed by being separated by a predetermined distance from metal wires not to be brought into contact with the metal wires.

The shape of the first optical barrier 142 may be formed to correspond to the shape of the optical sensor 180 so as to efficiently block light transferred to the optical sensor 180. The thickness and height of the first optical barrier 142 may be variously set depending on the internal structure of the light source module 100.

The first optical barrier 142 may be manufactured to correspond to the shape of the receiver lens structure 170 or the frame 140. In this case, the light transferred to a receiver of the light source module 100 may include only the reflection light of a subject which passes through the optical devices of the receiver lens structure 170, whereby it is possible to improve the accuracy of image or distance measurement. The first optical barrier 142 may be brought into contact with the receiver lens structure 170, and thereby, may form a sealed space or block an optical path other than an optical axis direction.

The second optical barrier 143 may have a shape surrounding the light source 110 to block light transferred from the light source 110.

The second optical barrier 143 may be disposed on the substrate 111, and may have a shape protruding from the substrate 111. The height of the uppermost end of the second optical barrier 143 may be set to be higher than the height of the uppermost surface of the light source 110.

The height of the second optical barrier 143 may be defined in correspondence to an emission angle of light arriving from the light source 110, and may be defined in correspondence to the shape and structure of the transmitter lens structure 130.

The second optical barrier 143 may be disposed to be separated by a predetermined distance from the light source 110 so as not to be brought into contact with metal wires of the light source 110.

The second optical barrier 143 may be manufactured to correspond to the shape of the transmitter lens structure 130 or the frame 140. In this case, the light transferred to the receiver of the light source module 100 may include only the reflection light of the subject through the optical devices of the receiver lens structure 170, whereby it is possible to improve the accuracy of image or distance measurement. The second optical barrier 143 may be brought into contact with the transmitter lens structure 130, and thereby, may form a sealed space or block an optical path other than an optical axis direction.

The first optical barrier 142 and the second optical barrier 143 as three-dimensional shapes may be structures which have symmetrical or asymmetrical shapes. If necessary, in order to increase the spatial integration degree of internal electronic devices (not illustrated), each of the optical barriers 142 and 143 may be formed to be long or thick so as to block light between the light source 110 and the optical sensor 180.

In the case where the light source module 100 includes the transmitter lens structure 130 and the receiver lens structure 170, space utilization efficiency may be increased when the optical barriers 142 and 143 are formed around the optical sensor 180 and the light source 110 as illustrated in FIG. 3 as compared to when the one optical barrier 141 is formed as illustrated in FIG. 2. In this case, the degree of integration of the parts of the light source module 100 may be increased.

In FIG. 3, a distance D2 between the light source 110 and the optical sensor 180 may be formed to be shorter than the distance D1 in FIG. 2, and thus, a circuit configuration or structures inside the light source module 100 may be fabricated in such a way to reduce the total volume of the light source module 100.

In FIG. 3, the distance between one point and another point of the inner surface of the first optical barrier 142 may be defined as a first distance D3, and the distance between one point and another point of the inner surface of the second optical barrier 143 may be defined as a second distance D4. The first distance D3 and the second distance D4 are for comparing the distance between the light source 110 and the optical sensor 180, and various criteria may be set without being limited to the above-described method.

Figure 4:
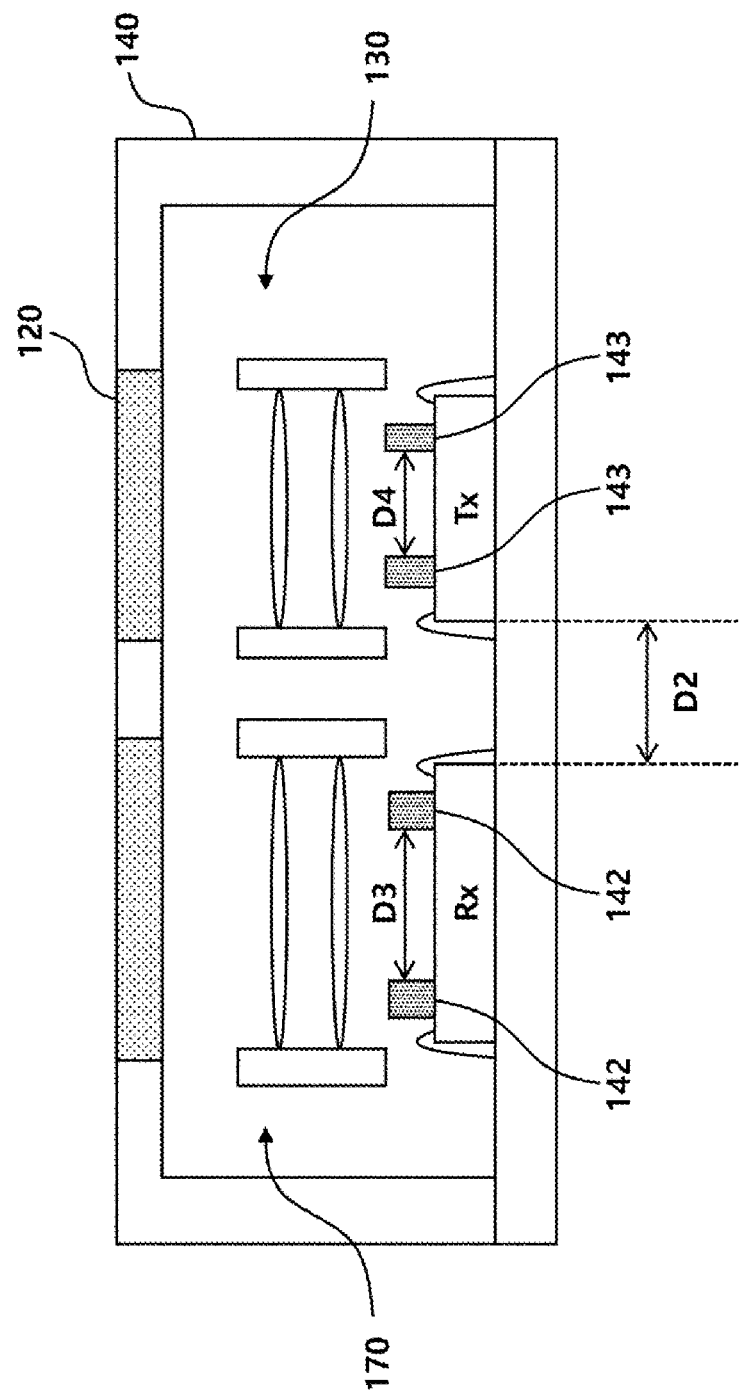
FIG. 4 is a view for explaining an optical barrier of a light source module in accordance with an embodiment.

FIG. 4 is a view for explaining an optical barrier of a light source module in accordance with an embodiment.

Referring to FIG. 4, a light source module 100 may include a transmitter lens structure 130, a first optical barrier 142, a second optical barrier 143 and a receiver lens structure 170.

The first optical barrier 142 may not be disposed on the substrate 111, and may be disposed on the surface of the optical sensor 180 or be disposed on the upper end of the optical sensor 180. For example, the first optical barrier 142 may be disposed on the open surface of the optical sensor 180, and may be in contact with the receiver lens structure 170.

The first optical barrier 142 may be disposed at a position that does not cover an active area in which the optical sensor 180 may sense light. In this case, the first distance D3 may be larger than or equal to the radius of the active area, and may be smaller than or equal to the radius of the lens of the receiver lens structure 170. In a case when the active area is not circular, D3 and D4 may be defined as distances between one point and another point of the barrier.

The second optical barrier 143 may not be disposed on the substrate 111, and may be disposed on the surface of the light source 110 or be disposed on the upper end of the light source 110. For example, the second optical barrier 143 may be disposed on the open surface of the light source 110, and may be in contact with the transmitter lens structure 130.

As the first optical barrier 142 and the second optical barrier 143 are not disposed on the surface of the substrate 111 but are disposed on the surfaces of the optical sensor 180 and the light source 110, the space utilization of the substrate 111 may be increased.

For example, by not disposing the first optical barrier 142 and the second optical barrier 143 on the substrate 111, a more space for disposing other devices, for example, a processor and a driver, on the substrate 111 may be secured. Further, by reducing the used area of the substrate 111, the size of the entire light source module 100 may be reduced, whereby it is possible to miniaturize a product.

Moreover, when the first optical barrier 142 and the second optical barrier 143 are not disposed on the substrate 111, optical barriers may be installed on the basis of the height of the optical sensor 180 and the height of the light source 110. Thus, the amount of a material used for forming the optical barriers may be reduced, and the optical barriers may be formed to higher positions.

In FIG. 4, the first distance D3 between one end and the other end of the inner surface of the first optical barrier 142 and the second distance D4 between one end and the other end of the inner surface of the second optical barrier 143 may be reduced as compared to those in FIG. 3. Thus, a space for disposing electronic parts may be additionally secured, and the degree of design freedom for disposing parts may be increased.

Figure 5:
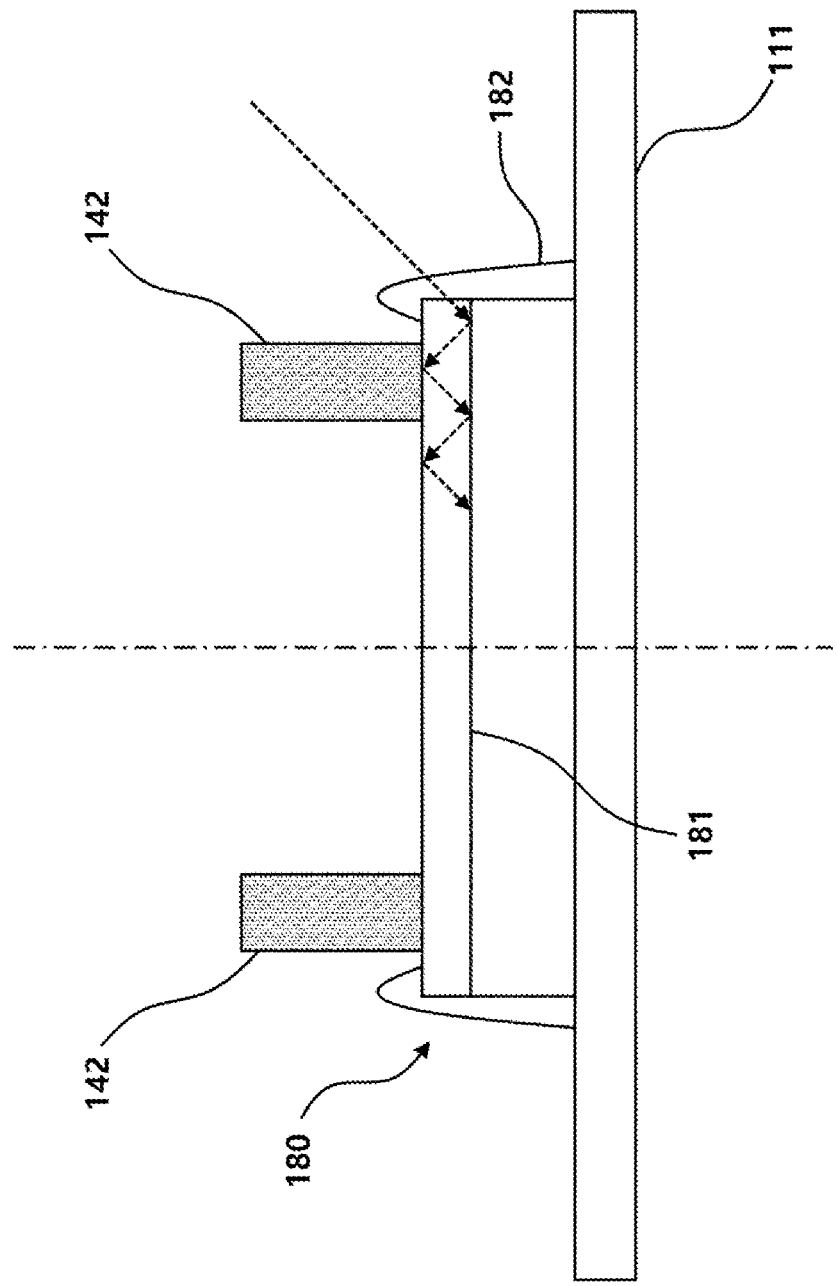
FIG. 5 is a view for explaining an optical path of a receiver of a light source module in accordance with an embodiment.

FIG. 5 is a view for explaining an optical path of a receiver of a light source module in accordance with an embodiment.

Referring to FIG. 5, the receiver of the light source module may include an optical sensor 180, a first optical barrier 142, and so forth.

The optical sensor 180 may include a light transmission layer 181 on the surface thereof. The light transmission layer 181 may be a separate structure which is separated from the optical sensor 180, but may be a conceptually separated structure.

The light transmission layer 181 may be a glass type optical device, but a type thereof is not limited as long as the light transmission layer 181 can transmit light. For example, the light transmission layer 181 may be a cover glass which is attached to the surface of the optical sensor 180.

Since the light transmission layer 181 disposed on the uppermost end of the optical sensor 180 has a predetermined thickness, the internal reflection light of the light source module 100 may enter the optical sensor 180 through a side surface part other than an optical axis.

In the case of the optical sensor 180 which has the light transmission layer 181, even when the first optical barrier 142 is formed on the upper end of the optical sensor 180, the optical sensor 180 is influenced by the light transferred from the side surface of the optical sensor 180. The light incident from the side surface may arrive at an active light sensing area of the optical sensor 180 by an optical path in the light transmission layer 181.

Figure 6:
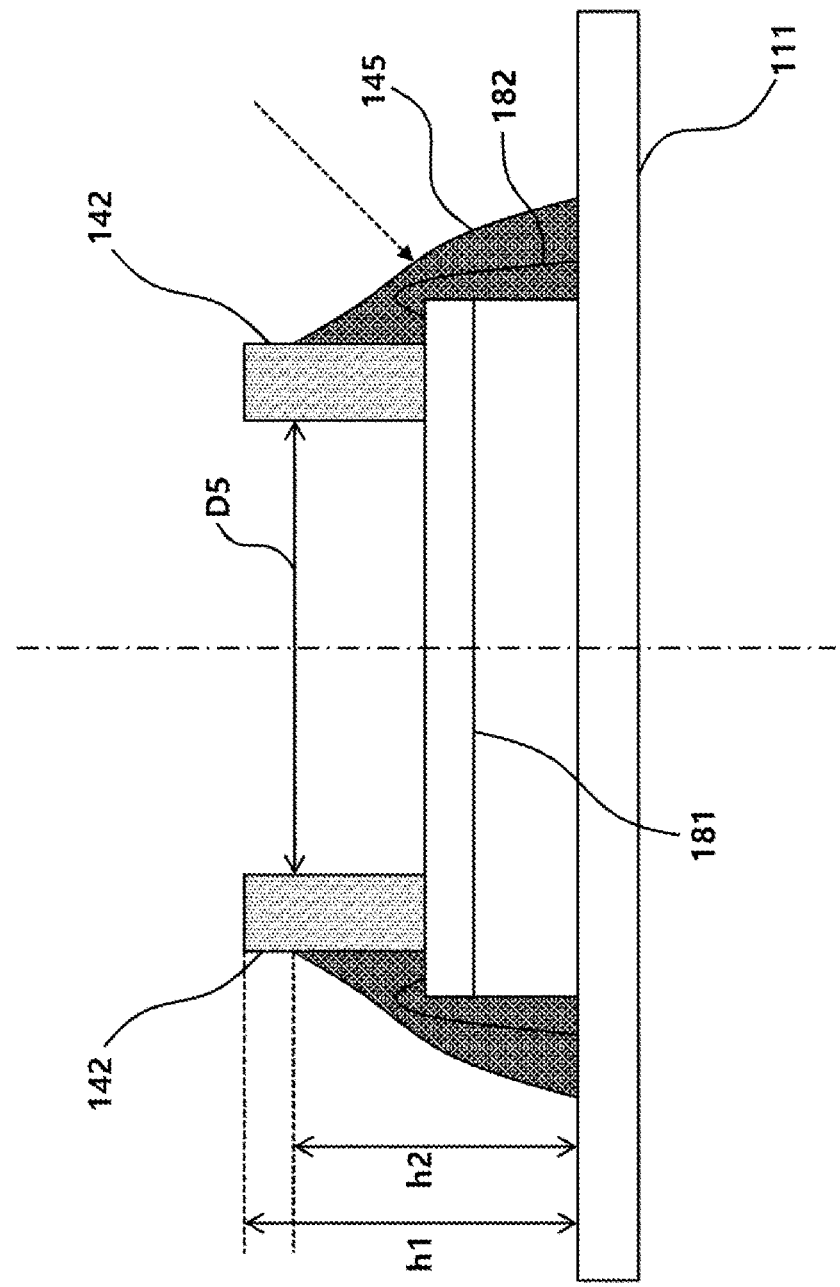
FIG. 6 is a view for explaining a side fill of a receiver of a light source module in accordance with an embodiment.

FIG. 6 is a view for explaining a side fill of a receiver of a light source module in accordance with an embodiment.

Referring to FIG. 6, the receiver of the light source module may include an optical sensor 180, a first optical barrier 142, a side fill 145, and so forth.

The side fill 145 may serve to reduce or block the intensity of light transferred from the side surface of the optical sensor 180. In addition, the side fill 145 may serve to block light having a predetermined wavelength band.

The side fill 145 is not limited thereto as long as the side fill 145 is a structure or material capable of blocking light, transferred to the optical sensor 180, by being brought into contact with the outer surface of the optical barrier 142 or the optical sensor 180.

The side fill 145 may be manufactured by curing a liquid material, or may be manufactured by thermally curing a polymer material. For example, the polymer material may be an epoxy-based polymer, but is not limited thereto.

In the case where the first optical barrier 142 is not present, when a liquid material is sprayed or applied to form the side fill 145, an active area for light sensing of the optical sensor 180 can not help but be affected. When the size of the optical sensor 180 is small, it becomes more difficult to perform control so that the active area is not affected.

The active area for light sensing may be an area for the optical sensor 180 to sense reflection light within an error range and may be an area having a predetermined radius from a measurement area on the basis of the optical axis of the optical sensor 180. If necessary, the active area may be defined as a circle having a radius D5. In a case when the active area is not circular, D5 may be defined as a distance between one point and another point of the barrier.

The first optical barrier 142 may serve to block the path of a liquid material having fluidity and thereby limit a position and structure where the side fill 145 is formed.

The first optical barrier 142 may be installed on the surface, for example, the surface not in contact with the substrate 111, of the optical sensor 180, and the structure and shape of the side fill 145 may be defined on the basis of the distance between the first optical barrier 142 and the substrate 111.

For example, a height h1 of the first optical barrier 142 may be higher than a height h2 of the side fill 145, and the height h2 of the side fill 145 may be defined to have a predetermined relative ratio with respect to the height h1 of the first optical barrier 142.

The side fill 145 may be formed by curing a liquid material in such a manner that metal wires 182 which electrically connect the optical sensor 180 and the substrate 111 are impregnated.

Wires made of a metal, for example, gold, may cause diffuse reflection inside the light source module, and due to this fact, may transfer unnecessary light to the optical sensor 180, thereby generating optical noise. When the liquid material is cured such that the side fill 145 includes therein all or some of the metal wires 182, the effect of preventing internal diffuse reflection may be more efficiently improved.

The electrical connection of the metal wires 182 may be cut off by an external impact. In this regard, since the side fill 145 is cured to include therein the metal wires 182, the electrical connection relationship between the optical sensor 182 and the substrate 111 may be more stably maintained, and the durability of the light source module may be improved.

The side fill 145 may form a structure which blocks light by curing a polymer for a portion of at least one surface of the first optical barrier 142 and/or the optical sensor 180.

A method for forming the side fill 145 may be a method in which a liquid material is thermally cured or UV-cured, a spray method, a coating method, an applying method, a method of coupling a structure manufactured in advance, etc., but is not limited thereto.

The surface of the side fill 145 may have a smooth curve such that, as illustrated in FIG. 6, the side fill 145 has a tapered shape in which a thickness gradually increases downward, but may be formed to have a constant thickness from the surface of the first optical barrier 142 or the optical sensor 180.

Besides the above-described structure, the side fill 145 may have an optional shape for blocking light passing through the light transmission layer 181.

Figure 7:
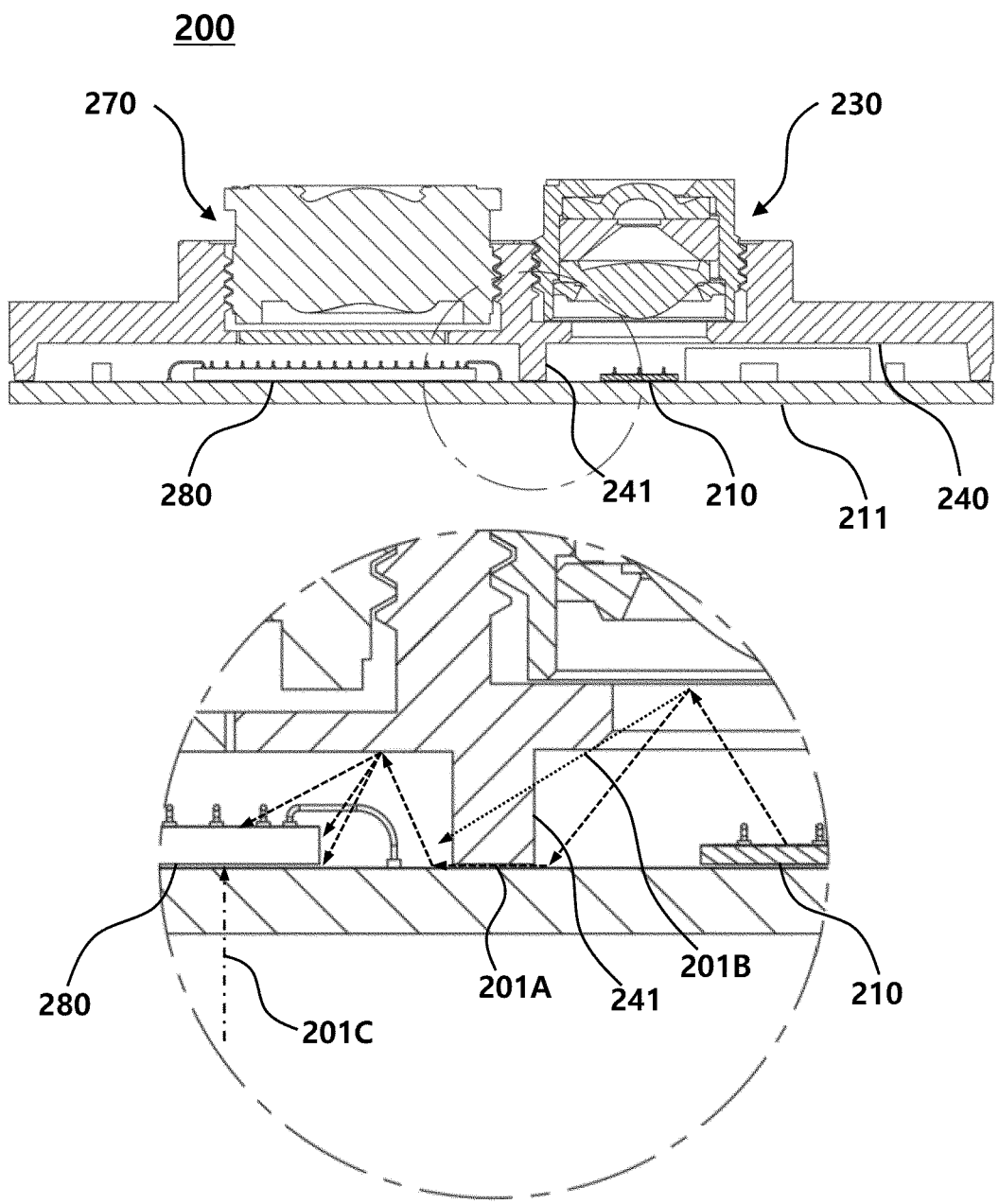
FIG. 7 is a cross-sectional view of a transmitter/receiver-integrated type light source module including an optical barrier in accordance with an embodiment.

FIG. 7 is a cross-sectional view of a transmitter/receiver-integrated type light source module including an optical barrier in accordance with an embodiment.

Figure 8:
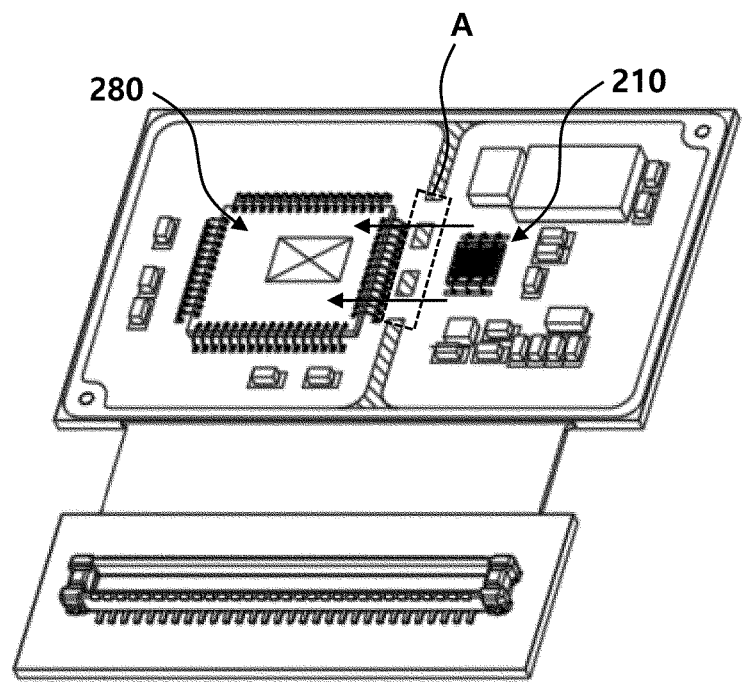
FIG. 8 is a view illustrating internal components of the transmitter/receiver-integrated type light source module in accordance with the embodiment.

FIG. 8 is a view illustrating internal components of the transmitter/receiver-integrated type light source module in accordance with the embodiment.

Figure 9:
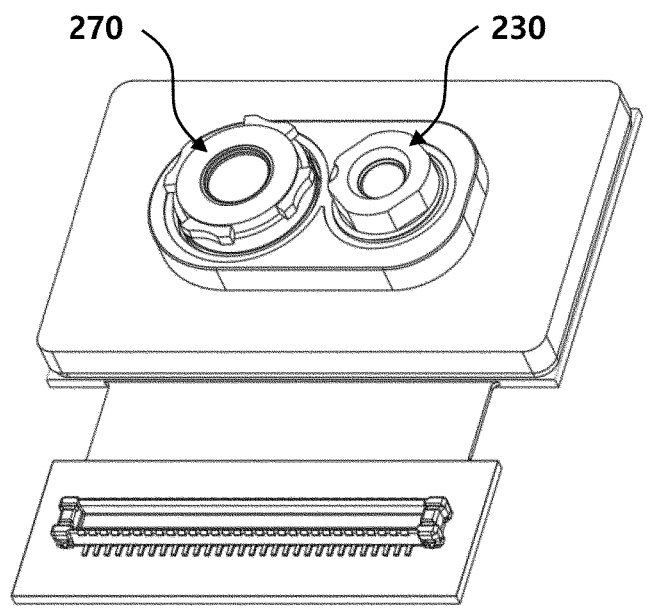
FIG. 9 is a view illustrating an outer appearance of the transmitter/receiver-integrated type light source module in accordance with the embodiment.

FIG. 9 is a view illustrating an outer appearance of the transmitter/receiver-integrated type light source module in accordance with the embodiment.

Referring to FIGS. 7 to 9, a light source module 200 may include a light source 210, a substrate 211, a transmitter lens structure 230, a frame 240, an optical barrier 241, a receiver lens structure 270 and an optical sensor 280, and the respective components may be components of the above-described light source module.

As can be seen from FIG. 8, when the optical barrier 241 is not formed, a light leakage may occur between the light source 210 and the optical sensor 280. Thus, the light source module 200 may include the optical barrier 241.

Referring to FIG. 7, the optical barrier 241 may be a structure which is formed as one end of the frame 240 extends, and may block light transferred to the optical sensor 280 by being generated inside the light source module 200 and diffusely reflected on the surfaces of the receiver lens structure 230, the frame 240, internal electronic parts (not illustrated), the substrate 211 and so forth. In this case, it is possible to solve a phenomenon in which the function of the optical sensor 280 deteriorates due to noise generated in the optical sensor 280 as light is refracted or transmitted inside the light source module 200.

The optical barrier 241 may be disposed in an area A of FIG. 8 between the light source 210 and the optical sensor 280 so as to prevent noise of the optical sensor 280 due to light leakage, but is not limited thereto.

Referring to FIG. 7, light from the light source 210 may be transferred through a first path 201A and a second path 201B.

As an epoxy-based polymer is applied on one end of the optical barrier 241 and then UV or thermal curing is conducted, a light blocking function may be performed.

While one end of the optical barrier 241 may block light by being brought into contact with the substrate 211, a fine gap may occur due to poor bonding, for example, owing to unevenness of the surface of the optical barrier 241 or non-uniform application of an adhesive, separation of an adhesion part by an expansion or contraction in the process of curing the adhesive, and so on.

The first path 201A may be a path through which light is transferred through a space formed between one end surface of the optical barrier 241 and the substrate 211.

Also, when light transferred from the light source 210 has a long wavelength such as near infrared (NIR) or infrared, the light may pass through the optical barrier 241, or light may pass through the optical barrier 241 due to a thin thickness of the optical barrier 241 or the characteristics of a used material. For example, the near-infrared may have a wavelength in the range of 700 to 2500 nm, but is not limited thereto.

The second path 201B may be a path of light which passes through the optical barrier 241.

Further, when a space is formed between the optical sensor 280 and the substrate 211, fine external light may be transferred to the optical sensor 280. When the light source module 200 has high sensitivity for long-distance and short-distance scanning, noise by such external light decreases the accuracy of image or distance measurement.

A third path 201C may be a path of external light which is transferred through a fine gap.

When light leaks into the optical sensor 280 or a space including the optical sensor 280 through the first to third paths 201A, 201B and 201C, the light may generate noise by being transferred to the upper surface of the optical sensor 280 or may generate noise through the diced surface of the optical sensor 280 made of glass.

Moreover, external light including daylight may generate noise, or noise may be generated as photons are introduced into the bottom surface of the optical sensor 280 due to poor application of a bonding solution including epoxy when the optical sensor 280 is attached.

Referring to FIG. 9, the light source module 200 may be configured as a single module in which a transmitter and a receiver are integrated with each other.

Figure 10:
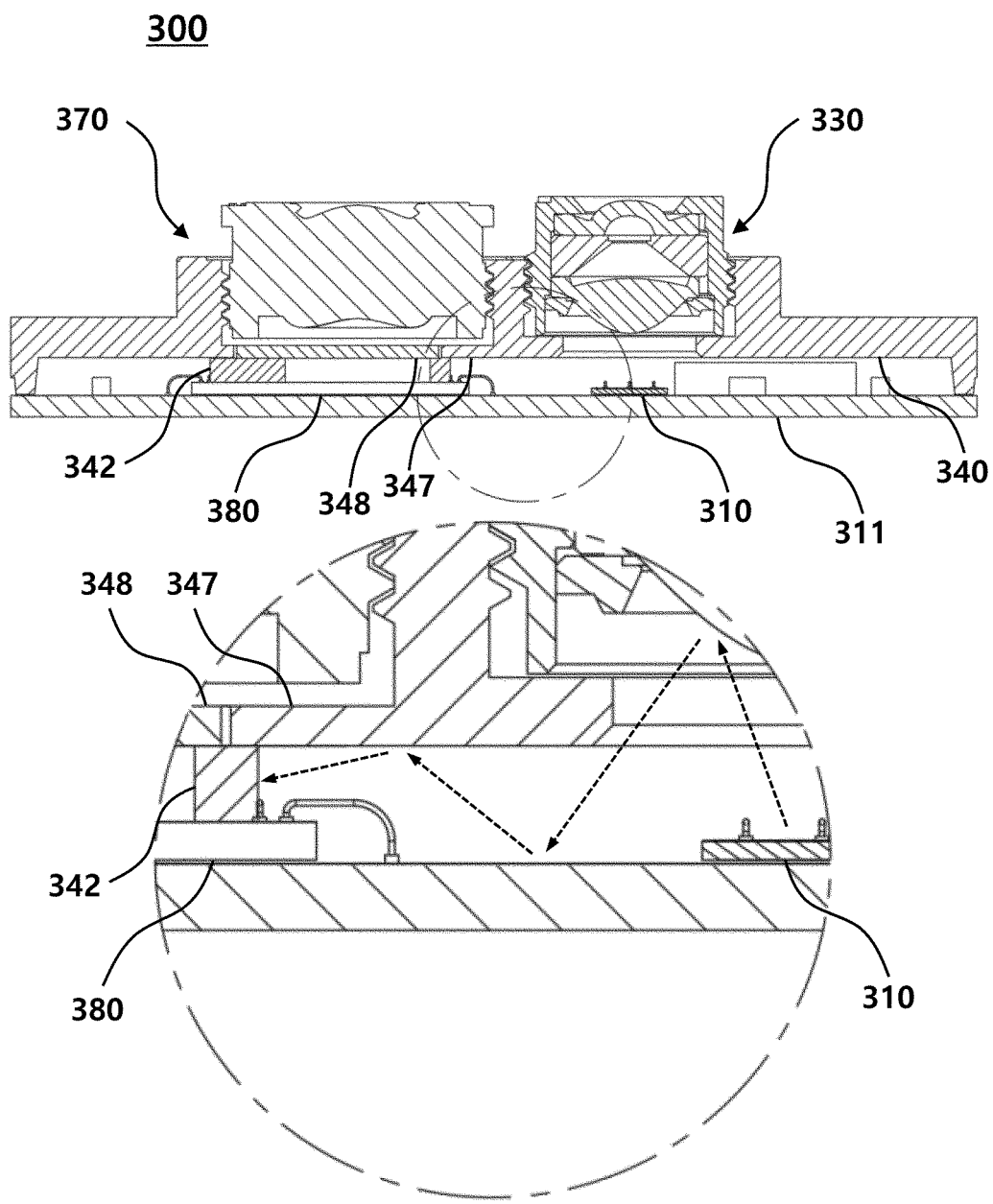
FIG. 10 is a cross-sectional view of a transmitter/receiver-integrated type light source module including an optical barrier in accordance with an embodiment.

FIG. 10 is a cross-sectional view of a transmitter/receiver-integrated type light source module including an optical barrier in accordance with an embodiment.

Figure 11:
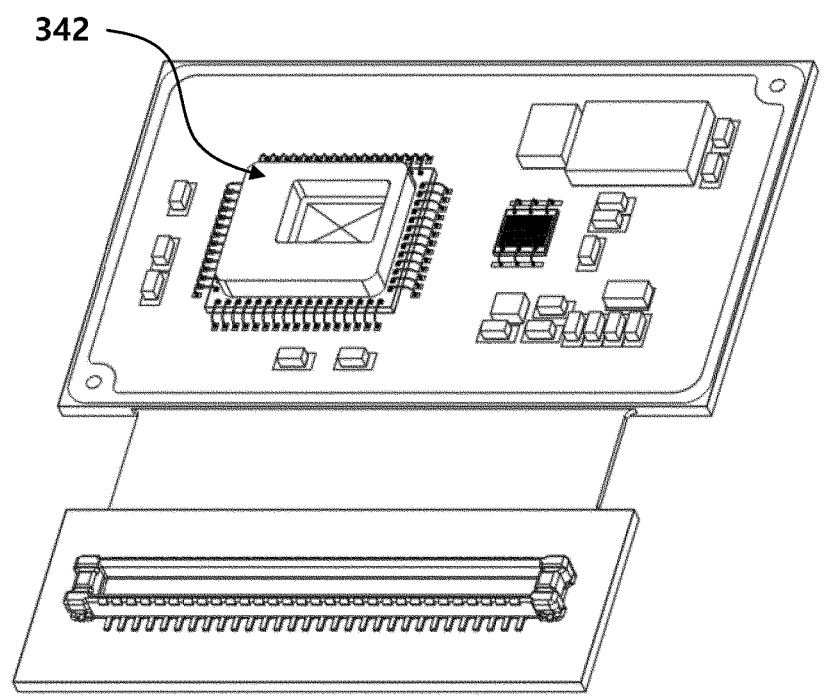
FIG. 11 is a view illustrating internal components of the transmitter/receiver-integrated type light source module in accordance with the embodiment.

FIG. 11 is a view illustrating internal components of the transmitter/receiver-integrated type light source module in accordance with the embodiment.

Figure 12:
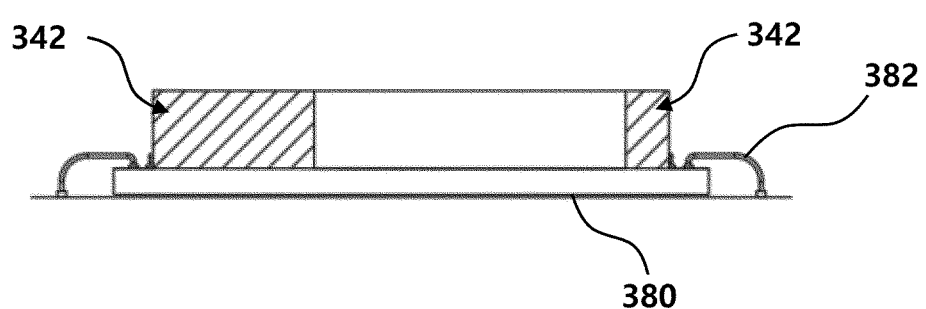
FIG. 12 is a view illustrating a receiver of the light source module in accordance with the embodiment.

FIG. 12 is a view illustrating a receiver of the light source module in accordance with the embodiment.

Figure 13:
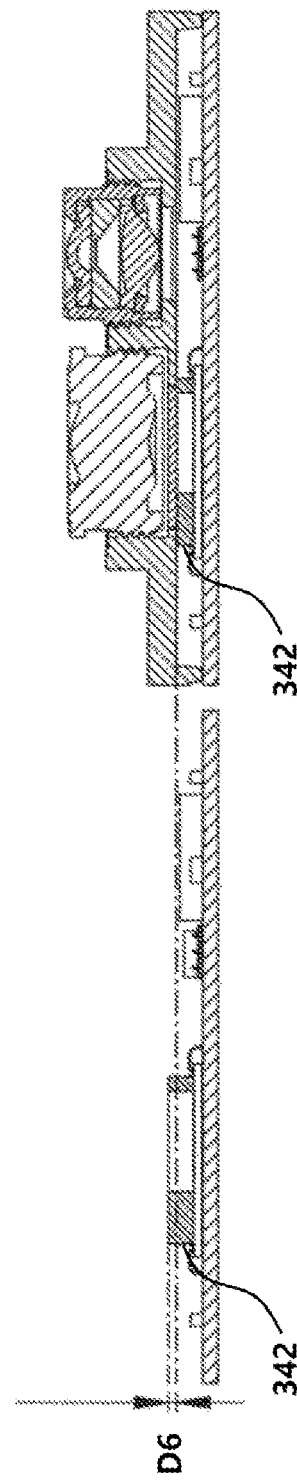
FIG. 13 is a view explaining a change occurred in a process of compressing the optical barrier in accordance with the embodiment.

FIG. 13 is a view explaining a change occurred in a process of compressing the optical barrier in accordance with the embodiment.

FIG. 14 is a view explaining the disposition of components of the light source module in accordance with the embodiment.

Referring to FIGS. 10 to 14, a light source module 300 may include a light source 310, a substrate 311, a transmitter lens structure 330, a frame 340, an optical barrier 342, a receiver lens structure 370 and an optical sensor 380, and the respective components may be components of the above-described light source module.

Referring to FIG. 10, the light source module 300 does not include an optical barrier which protrudes from the frame 340, and may include the separate optical barrier 342.

The optical barrier 342 may be a structure which is attached to the surface of the optical sensor 380 and blocks leakage light transferred from the surroundings.

The optical barrier 342 may be disposed in an area other than an area which is defined as an optical active area of the optical sensor 380. The disposing position of the optical barrier 342 may be determined as an area other than an area where the wires (not illustrated) and pads (not illustrated) of the optical sensor 380 are disposed.

The optical barrier 342 may be a structure for blocking leakage light and reflection light inside the light source module 300 and preventing optical noise caused thereby, but may perform together a function of protecting the optical sensor 380 from dust, moisture and contaminants.

When the optical barrier 342 does not have a structure which extends from the frame 340 and is attached, as a separate component, to the surface of the optical sensor 380, a space for disposing electronic parts may be additionally secured. As a consequence, the disposition of the electronic parts may be variously changed, and the size of the light source module 300 may be reduced.

The optical barrier 342 is disposed between a holder 347 as a portion extending from the frame 340 or an infrared filter 348 and the optical sensor 380 and continuously receives pressure. Therefore, it is possible to prevent a separation phenomenon that may occur in the process of applying and curing an adhesive material, and due to this fact, light leakage may be effectively prevented.

Referring to FIGS. 11 and 12, the optical barrier 342 of the light source module 300 may be attached to an area other than an active area of the optical sensor 380, and each area may have an asymmetric size according to the shape of the active area. Also, the optical barrier 342 may be attached to an area other than an area where metal wires 382 are connected.

Referring to FIG. 13, the optical barrier 342 is formed to be higher than the height of the lower surface of the frame 340 or the height of the infrared filter 348, and may be compressed by a predetermined distance D6. As the optical barrier 342 is brought into contact with the lower surface of the frame 340 or the infrared filter 348, light leakage may be effectively prevented. When prominences and depressions exist in the frame 340, the optical barrier 342 and the infrared filter 348, a light leakage phenomenon that may occur in the process of assembling the respective components may be prevented using the optical barrier 342 having a predetermined compressibility.

Referring to FIG. 14, a light source module 300B in which an optical barrier is attached to the upper surface of an optical sensor may additionally secure a space for disposing electronic parts, as compared to a light source module 300A in which light is blocked by a structure between a light source and an optical sensor. In this case, since the distance between a light source (not illustrated) and an optical sensor (not illustrated) may be reduced, a control speed by a processor (not illustrated) may be increased as well.

Figure 15:
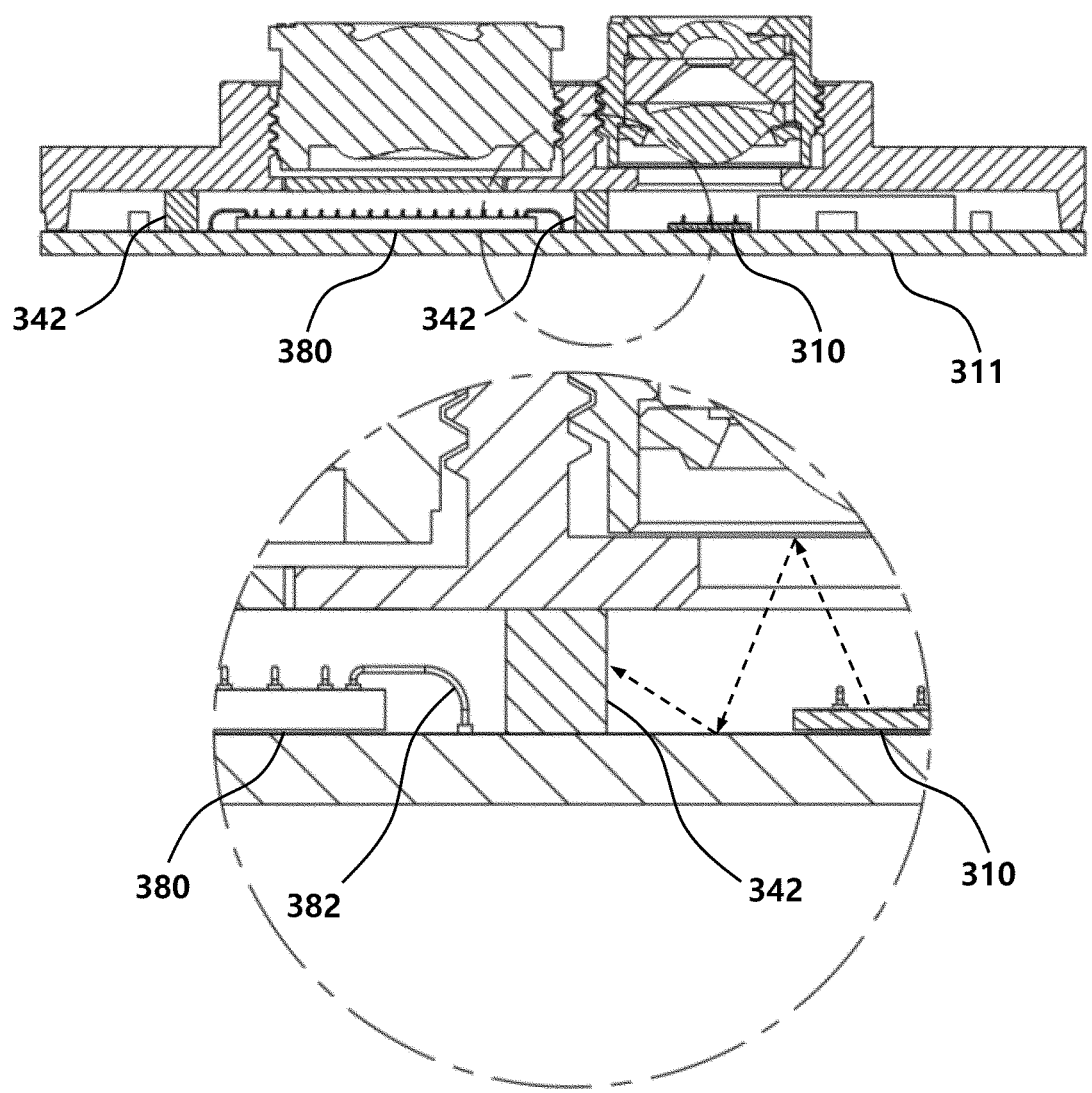
FIG. 15 is a cross-sectional view of a transmitter/receiver-integrated type light source module including an optical barrier in accordance with an embodiment.

FIG. 15 is a cross-sectional view of a transmitter/receiver-integrated type light source module including an optical barrier in accordance with an embodiment.

Referring to FIG. 15, the optical barrier 342 of the light source module 300 is not attached to the upper surface of the optical sensor 380, and may be attached to the substrate 311.

The optical barrier 342 may be disposed at an optional position on the substrate 311 so as not to be in contact with the optical sensor 380 and the wires 382, and may be disposed to surround the optical sensor 380.

The optical barrier 342 may be disposed on the substrate 311 in order to exclude risk factors, such as contamination on assembly or interference with an optical active area, that may occur in the process of disposing the optical barrier 342 on the surface of the optical sensor 380.

The optical barrier 342 may be a structure capable of blocking contaminants and optical noise due to diffuse reflection of photons introduced into the surface of the optical sensor 380, dust, moisture, wires and parts.

The optical barrier 342 has a structure without a light leakage preventing structure which extends from the holder 347. The optical barrier 342 may be a structure blocking a path through which noise is introduced through the diced surface of the optical sensor 380 made of glass, by a light leakage preventing shield on the upper surface of the substrate 311, for example, a printed circuit board (PCB).

The optical barrier 342 may be a structure capable of blocking light leakage that may occur due to the application of epoxy and a thermal curing state in the light source module 300.

The optical barrier 342 of FIG. 15 has a changed disposing position, and may perform the same function as the above-described optical barrier.

Figure 16:
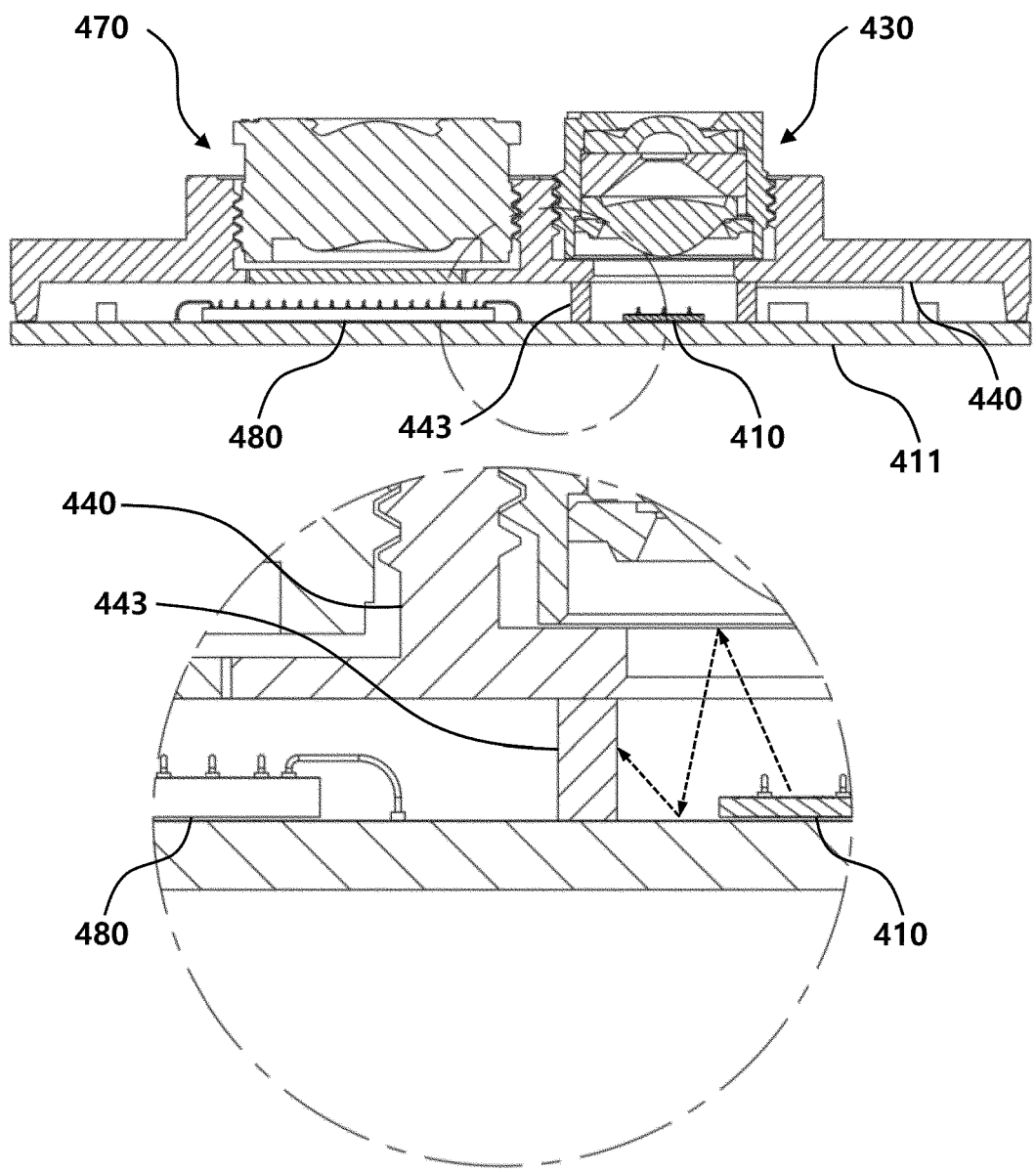
FIG. 16 is a cross-sectional view of a transmitter/receiver-integrated type light source module including an optical barrier in accordance with an embodiment.

FIG. 16 is a cross-sectional view of a transmitter/receiver-integrated type light source module including an optical barrier in accordance with an embodiment.

Figure 17:
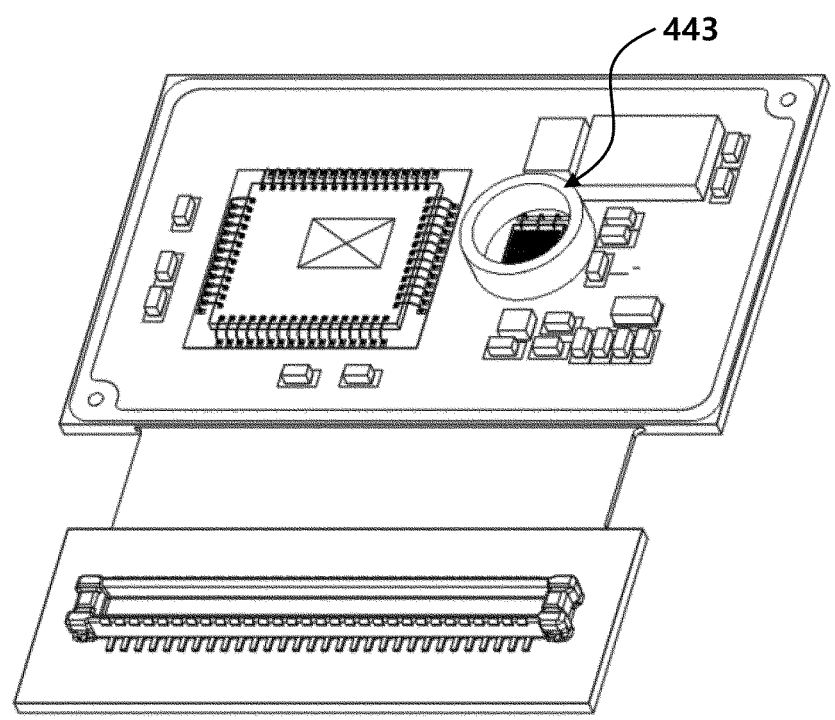
FIG. 17 is a view illustrating internal components of the transmitter/receiver-integrated type light source module in accordance with the embodiment.

FIG. 17 is a view illustrating internal components of the transmitter/receiver-integrated type light source module in accordance with the embodiment.

Figure 18:
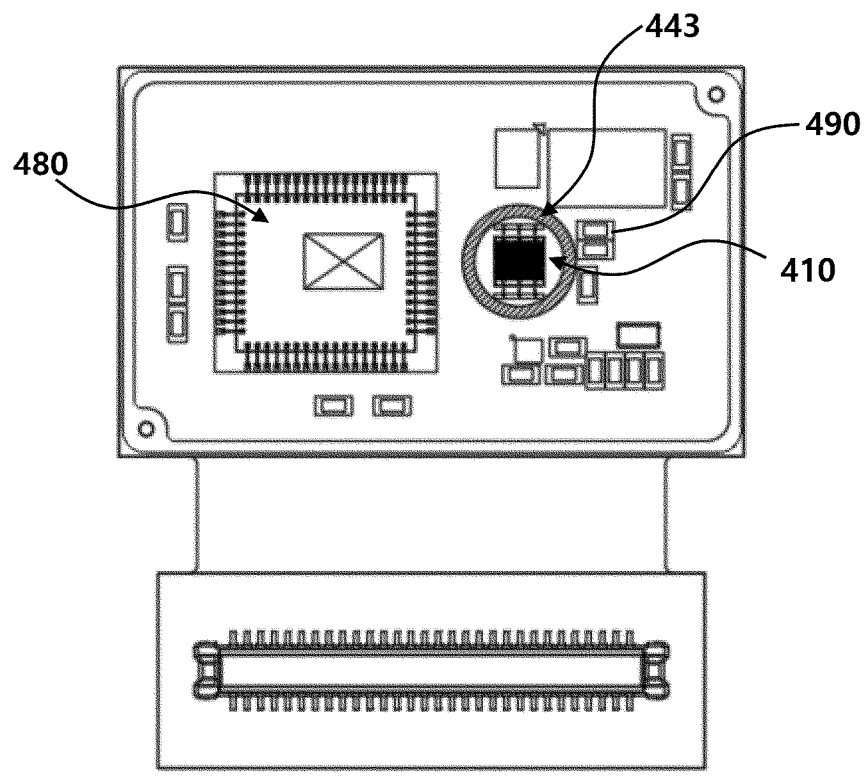
FIG. 18 is a top view illustrating the internal components of the transmitter/receiver-integrated type light source module in accordance with the embodiment.

FIG. 18 is a top view illustrating the internal components of the transmitter/receiver-integrated type light source module in accordance with the embodiment.

Referring to FIGS. 16 to 18, a light source module 400 may include a light source 410, a substrate 411, a transmitter lens structure 430, a frame 440, an optical barrier 443, a receiver lens structure 470, an optical sensor 480 and electronic parts 490, and the respective components may be components of the above-described light source module.

The optical barrier 443 may be disposed at an optional position on the substrate 411 so as not to be in contact with the light source 410 and wires (not illustrated), and may be disposed to surround the light source 410.

The optical barrier 443, as a structure which primarily blocks light leakage in an area adjacent to the light source 410, may be disposed simultaneously or separately from an optical barrier (not illustrated) around the optical sensor 480.

The light source module 400 may have a structure without a light leakage preventing structure which extends from a holder (not illustrated) extending from the frame 440. The optical barrier 443 may be attached to the bottom of the holder and the upper surface of the substrate 411, and thereby, may prevent light emitted from the light source 410 from leaking, as photons, out of the area of the optical barrier 443.

The optical barrier 443 may be a structure capable of blocking dust and moisture introduced from the outside, optical noise from an external light source and contaminants.

The optical barrier 443, as a structure which blocks external light introduced into an emitter or aperture of a light exit of the light source 410 emitting light of a specific wavelength, may be a shielding structure which protects change in wavelength and optical characteristics. The optical barrier 443 may be a structure which prevents light emitted from the light source 410 from being transferred to the optical sensor 480, but may be a structure which blocks external light transferred to the light source 410.

Similarly to the above-described optical barrier (not illustrated) of the optical sensor 480, the optical barrier 443 may be a structure which blocks a space formed between the back surface of the light source 410 and the upper surface of the substrate 411 after curing of a bonding solution in the process of attaching the light source 410 to the substrate 411 and thereby blocks external light introduced into the back surface of the light source 410.

The electronic parts 490 may be a processor (not illustrated) for calculation of the light source module 400, a driver (not illustrated) for driving the light source 410, and so forth, and may be parts which are electrically connected to the substrate 411.

The optical barrier 443 may be disposed around the light source 410 which has a relatively smaller size than the size of the optical sensor 380, thereby increasing the space utilization of the substrate 411.

Figure 19:
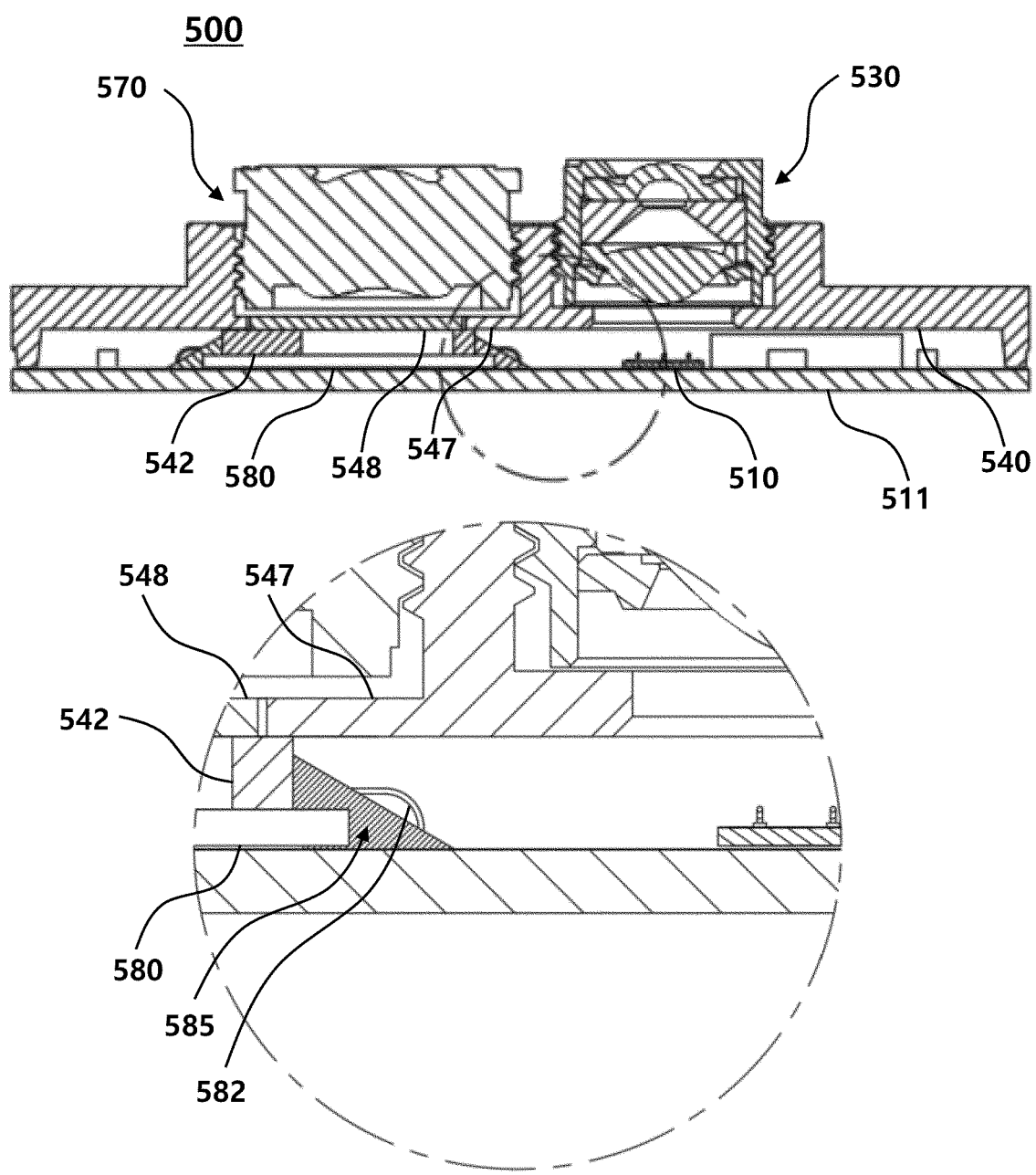
FIG. 19 is a cross-sectional view of a transmitter/receiver-integrated type light source module including an optical barrier in accordance with an embodiment.

FIG. 19 is a cross-sectional view of a transmitter/receiver-integrated type light source module including an optical barrier in accordance with an embodiment.

Figure 20:
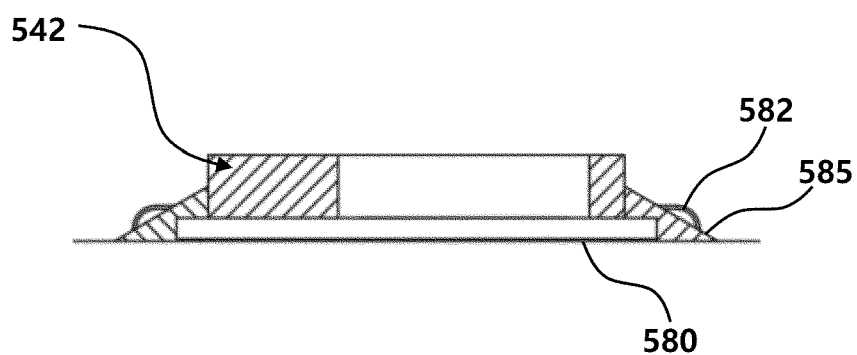
FIG. 20 is a view illustrating a receiver of the light source module in accordance with the embodiment.

FIG. 20 is a view illustrating a receiver of the light source module in accordance with the embodiment.

Referring to FIGS. 19 and 20, a light source module 500 may include a light source 510, a substrate 511, a transmitter lens structure 530, a frame 540, an optical barrier 542, a receiver lens structure 570 and an optical sensor 580, and the respective components may be components of the above-described light source module.

The light source module 500 may further include a side fill 585.

The optical barrier 542 may be disposed on the upper surface of the optical sensor 580, and may be disposed to be fitted in contact with a holder 547 or an infrared filter 548 which extends from the frame 540.

The side fill 585 may be configured to block leakage light inside the light source module 500 by connecting the outer surfaces of the optical sensor 580 and the optical barrier 542.

The side fill 585 may be disposed in an area other than the light sensing area of the optical sensor 580. For example, the side fill 585 may be disposed on a portion of the upper surface and a diced side surface of the optical sensor 580.

The side fill 585 may be formed by applying a bonding solution including an epoxy-based polymer after the optical sensor 580 is attached to the substrate 511. For example, the side fill 585 may block even light passing through the lower surface of the optical sensor 580, by filling a bonding solution in a space between the upper surface of the substrate 511 and the back surface of the optical sensor 580.

When the side fill 585 is filled in the space between the upper surface of the substrate 511 and the back surface of the optical sensor 580, it is possible to reduce light sensing noise generated as light is introduced into an optical path formed due to poor application of a bonding solution in the process of attaching the optical sensor 580 to the substrate 511 or an optical path formed on the bottom surface of the optical sensor 580 in the process of curing the bonding solution.

The side fill 585 may include therein all or some of wires which electrically connect the substrate 511 and the optical sensor 580 to transfer a control signal or a power signal, and due to this fact, may solve the problem of a diffuse reflection caused by the presence of the wires.

Since the side fill 585 may provide a light blocking function and at the same time may strengthen the adhesive force of each component, it is possible to prevent the optical sensor 580 from being released due to an external impact and to prevent a crack or a snap of a wire.

The height of the side fill 585 may be set to be equal to or lower than the height of the optical barrier 542.

The surface of the cross-section of the side fill 585 may be set as a straight line represented by a linear function, but may be set as a curve represented by a quadratic function. The surface of the cross-section of the side fill 585 may be differently defined depending on the size, position, etc. of each of the optical sensor 580 and the optical barrier 542.

Figure 21:
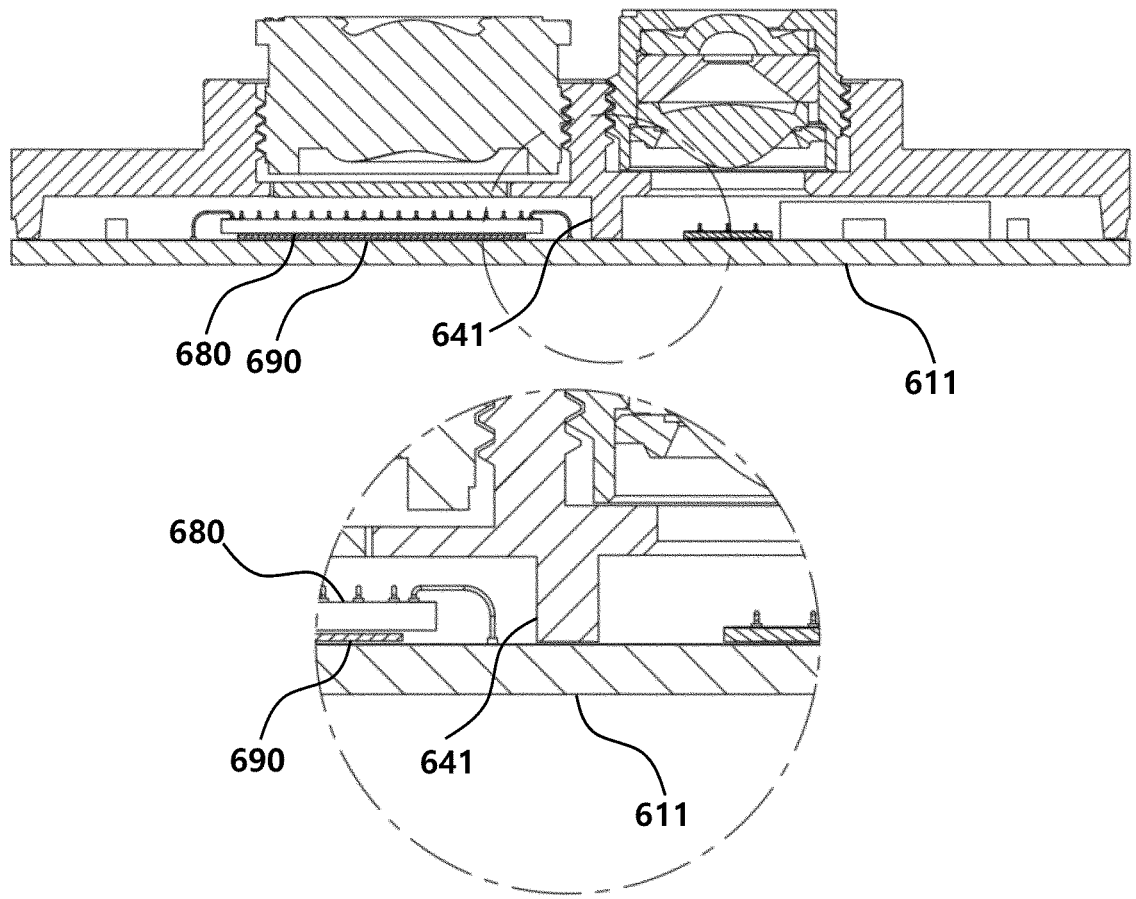
FIG. 21 is a cross-sectional view of a transmitter/receiver-integrated type light source module including an optical barrier in accordance with an embodiment.

FIG. 21 is a cross-sectional view of a transmitter/receiver-integrated type light source module including an optical barrier in accordance with an embodiment.

Referring to FIG. 21, a light source module 600 may include an optical barrier 641, an optical sensor 680, a blocking sheet 690, and so forth.

The blocking sheet 690 may be a sheet for blocking external light introduced into the bottom surface of the optical sensor 680. By attaching the blocking sheet 690 to the bottom surface of the optical sensor 680, it is possible to prevent noise caused by external light including daylight.

The blocking sheet 690 may be a sheet which blocks light of an area including an optical active area. Light transferred to the optical active area, as an area in which the optical sensor 680 may sense light, may pass through the upper surface or the lower surface of the optical sensor 680.

The type of the blocking sheet 690 is not limited as long as the blocking sheet 690 is a sheet capable of reducing the intensity of light or blocking light of a predetermined wavelength band. The blocking sheet 690 may be a sheet manufactured by curing a liquid polymer material, but may be a sheet manufactured by processing a solid metal material.

The blocking sheet 690 may be disposed between the optical sensor 680 and the substrate 611, and thereby, may block light supplied to the bottom surface of the optical sensor 680.

A metal pattern may be formed on the surface of the substrate 611, and light inside the light source module 600 may be transferred to the optical sensor 680 by being reflected on the metal pattern formed on the surface of the substrate 611. In this case, the blocking sheet 690 may effectively reduce noise caused by the reflection light transferred to the optical sensor 680.

The blocking sheet 690 may be formed to correspond to the shape of the metal pattern on the surface of the substrate 611, but may have a sufficient size to cover the shape of the metal pattern. For example, the blocking sheet 690 may be manufactured to correspond to the size of the optical active area of the optical sensor 680.

The blocking sheet 690 may be formed on each surface of the substrate 611. For example, the blocking sheet 690 may be a first blocking sheet which is attached to a first surface of the substrate 611, and may be a second blocking sheet which is attached to a second surface of the substrate 611. The first surface and the second surface of the substrate 611 may be the upper surface and the lower surface of the substrate 611. If necessary, a surface to which the optical sensor 680 is attached may be defined as the first surface, and a surface to which the optical sensor 680 is not attached may be defined as the second surface.

A side fill (not illustrated) may be formed around an area where the blocking sheet 690 is additionally formed, thereby improving a fixing force and at the same time improving light blocking rate.

The blocking sheet 690 may be a single blocking sheet, but a plurality of blocking sheets may be defined. For example, when two blocking sheets are disposed on the upper and lower surfaces of the substrate 611, light transferred to the optical sensor 680 may be effectively blocked.

The light source module 600 to which the blocking sheet 690 is attached may be implemented with the above-described optical barrier and side fill, and is not limited to that illustrated in FIG. 21.

Figure 22:
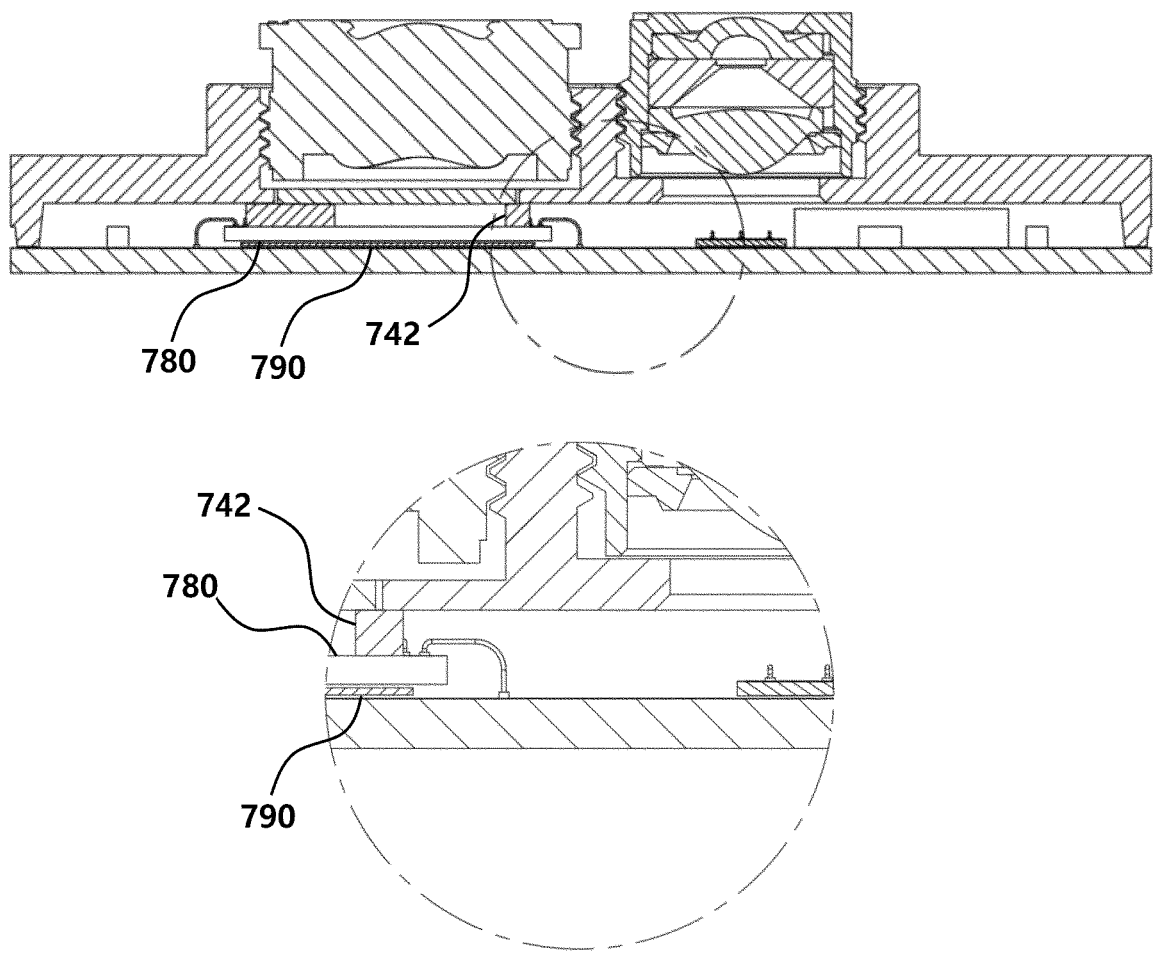
FIG. 22 is a cross-sectional view of a transmitter/receiver-integrated type light source module including an optical barrier in accordance with an embodiment.

FIG. 22 is a cross-sectional view of a transmitter/receiver-integrated type light source module including an optical barrier in accordance with an embodiment.

Referring to FIG. 22, a light source module 700 may include an optical barrier 742, an optical sensor 780, a blocking sheet 790, and so forth, and the respective components may perform the above-described functions.

Figure 23:
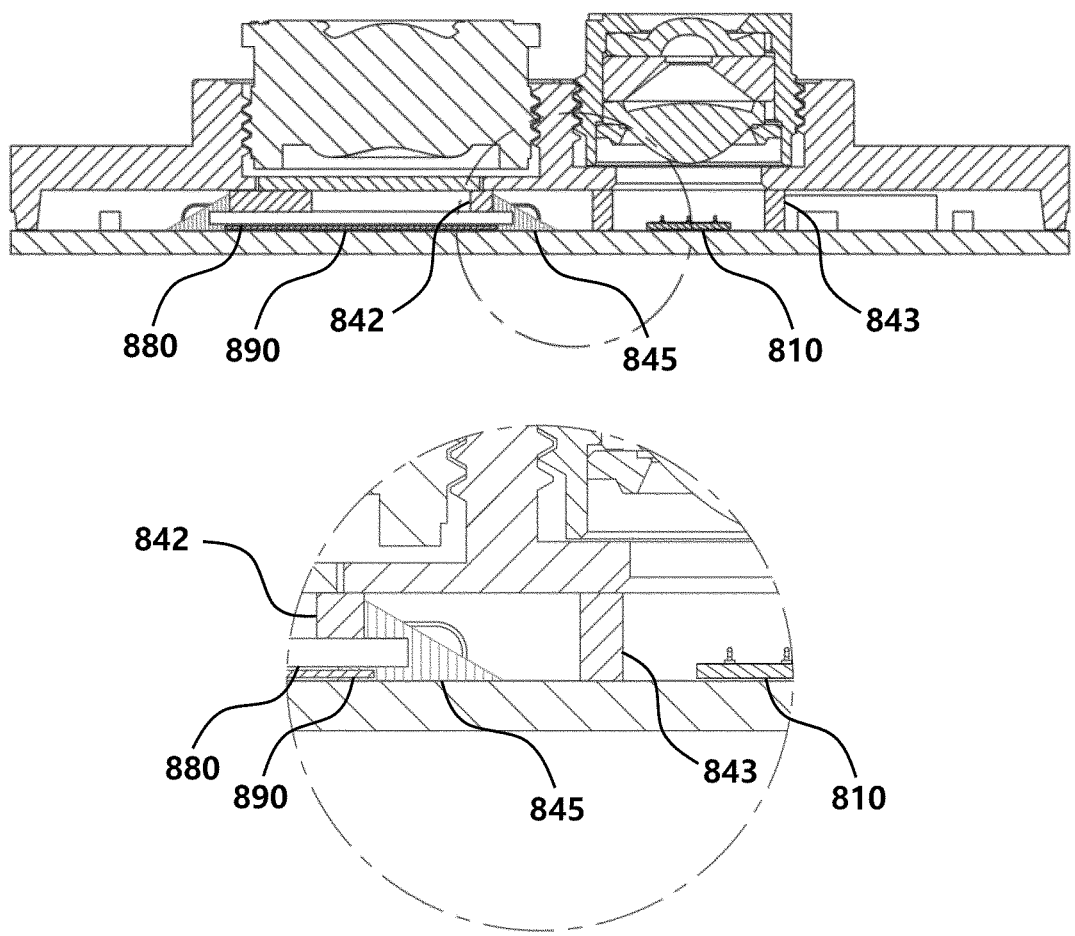
FIG. 23 is a cross-sectional view of a transmitter/receiver-integrated type light source module including an optical barrier in accordance with an embodiment.

FIG. 23 is a cross-sectional view of a transmitter/receiver-integrated type light source module including an optical barrier in accordance with an embodiment.

Referring to FIG. 23, a light source module 800 may include a light source 810, a first optical barrier 842, a second optical barrier 843, a side fill 845, an optical sensor 880, a blocking sheet 890, and so forth, and the respective components may perform the above-described functions.

Figure 24:
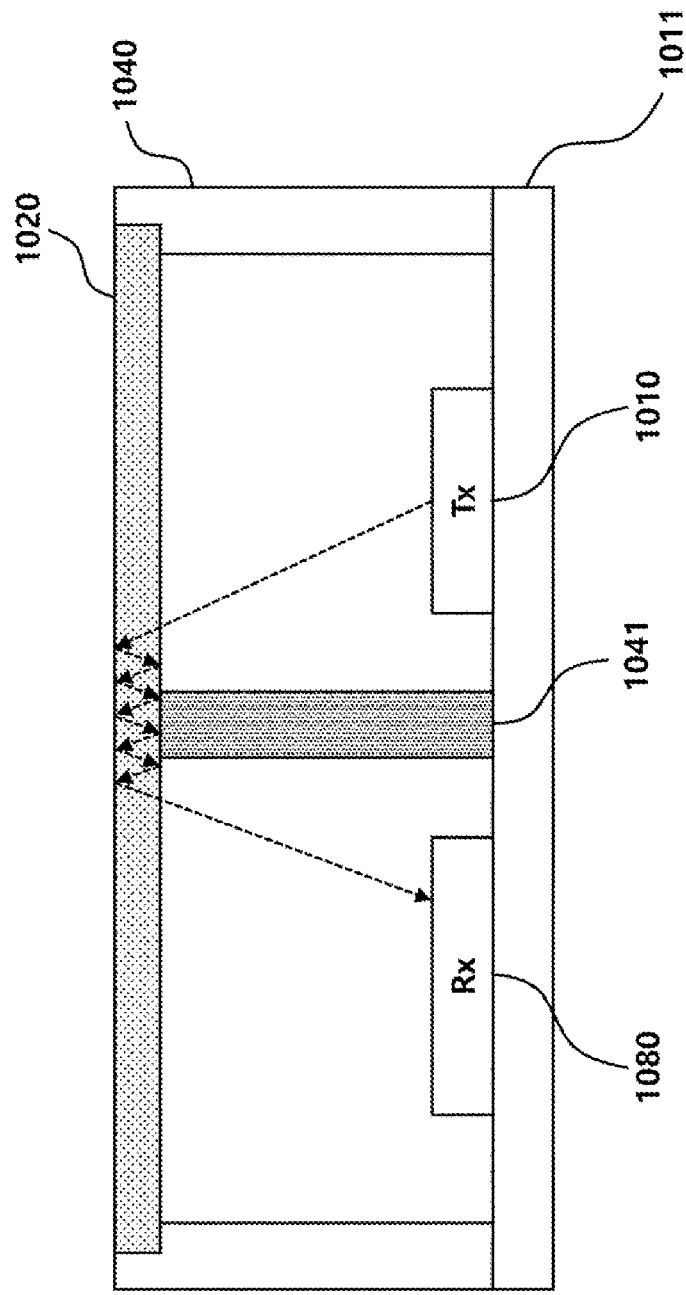
FIG. 24 is a view illustrating an optical device of a light source module including an optical barrier in accordance with an embodiment.

FIG. 24 is a view illustrating an optical device of a light source module including an optical barrier in accordance with an embodiment.

Referring to FIG. 24, a light source module 1000 may include a light source 1010, a substrate 1011, an optical device 1020, a frame 1040, an optical barrier 1041, and an optical sensor 1080.

The light source 1010, the substrate 1011, the optical device 1020, the frame 1040, the optical barrier 1041 and the optical sensor 1080 may be components of the above-described light source module.

The optical barrier 1041 may be disposed between the light source 1010 and the optical sensor 1080, and thereby, may block internal light from being transferred from the light source 1010 to the optical sensor 1080.

Although the optical barrier 1041 may be disposed between the light source 1010 and the optical sensor 1080 and thereby may block internal light from being transferred from the light source 1010 to the optical sensor 1080, light may be transferred to the optical sensor 1080 by an optical path which is formed in the optical device 1020.

The optical device 1020 may be an integrated optical device which is used in common for a transmitter and a receiver of the light source module 1000. In this case, the process difficulty and cost may be reduced as compared to the case of using different optical devices for a transmitter and a receiver, respectively, of a light source module, but noise generated by the formation of an optical path in the optical device 1020 may be caused.

Figure 25:
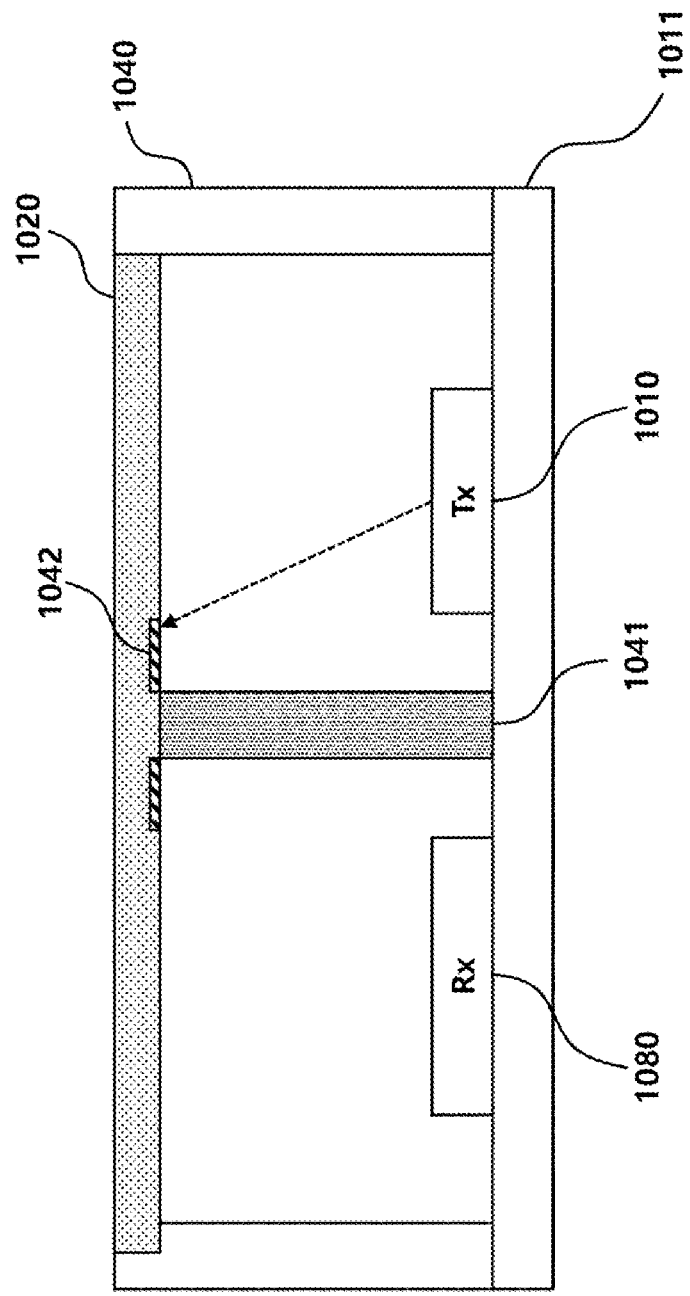
FIG. 25 is a view illustrating the optical barrier of the optical device in accordance with the embodiment.

FIG. 25 is a view illustrating the optical barrier of the optical device in accordance with the embodiment.

Referring to FIG. 25, the light source module 1000 may further include a first auxiliary optical barrier 1042.

The first auxiliary optical barrier 1042 may be a light blocking layer which is formed by electrically patterning the surface of the optical device 1020 through processing, and may serve as a blocking filter to block light having a predetermined wavelength band.

The first auxiliary optical barrier 1042 may be a part of the optical device 1020, but may have a structure which is separated from the optical device 1020.

The shape and position of the first auxiliary optical barrier 1042 may be differently defined in consideration of the emission angle or path of light transferred from the light source 1010. For example, an active emission area may be defined on the basis of the intensity distribution of light transferred from the light source 1010, and the first auxiliary optical barrier 1042 may be formed in an area other than the active emission area.

The first auxiliary optical barrier 1042 may be formed in the space of the transmitter of the light source module 1000 which is formed by the optical barrier 1041, but may also be formed in the space of the receiver of the light source module 1000.

Figure 26:
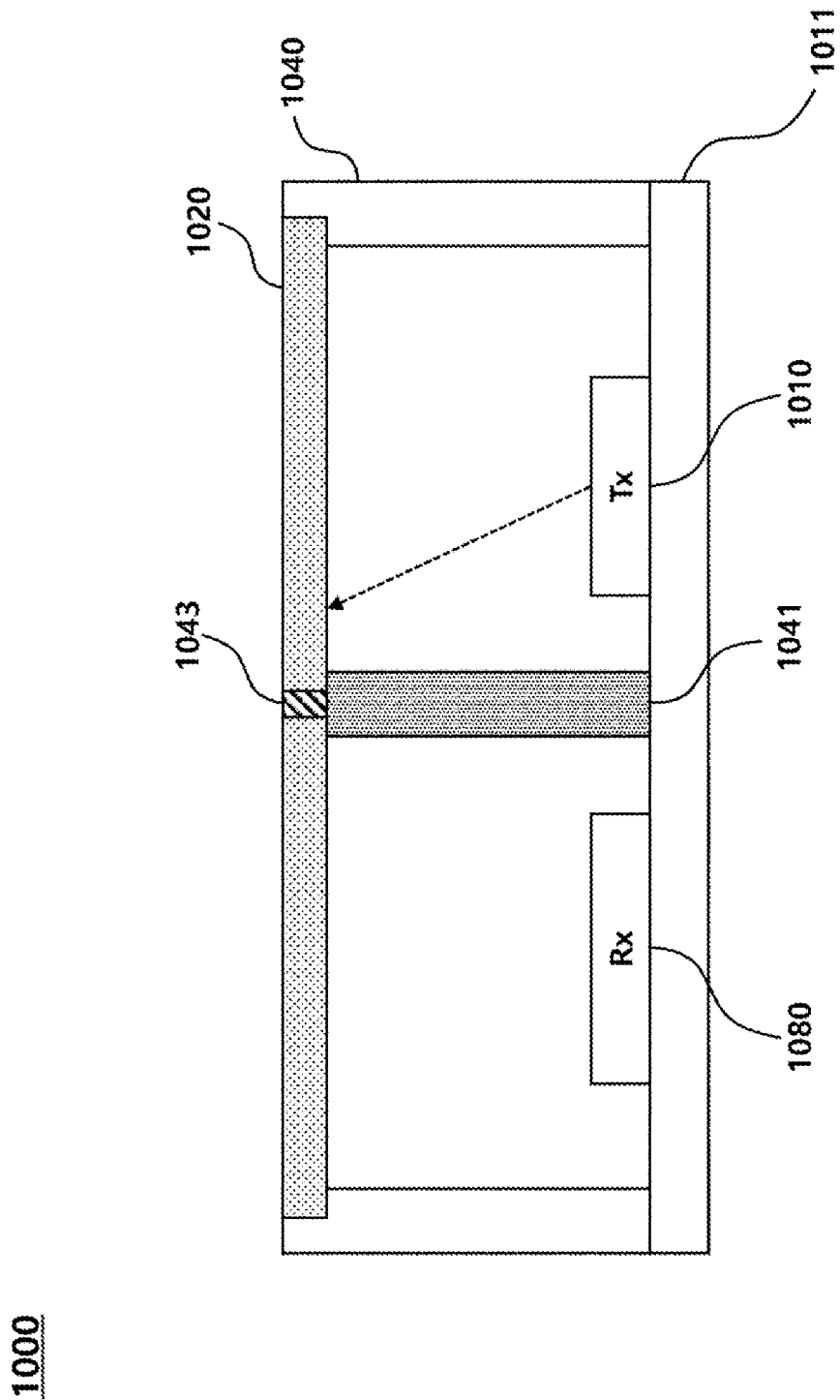
FIG. 26 is a view illustrating the optical barrier of the optical device in accordance with the embodiment.

FIG. 26 is a view illustrating the optical barrier of the optical device in accordance with the embodiment.

Referring to FIG. 26, the light source module 1000 may further include a second auxiliary optical barrier 1043.

The second auxiliary optical barrier 1043 may be a barrier structure which is formed by processing the surface of the optical device 1020, and may be defined in a hole which passes through the optical device 1020 or a groove which is formed by processing only a portion of the thickness of the optical device 1020.

The second auxiliary optical barrier 1043 may be defined as a configuration which is formed as a liquid material, for example, a light blocking material, is introduced into the hole or the groove and is then cured, and thereby blocks light.

The second auxiliary optical barrier 1043 may serve to reduce or block the intensity of light passing through the interior of the optical device 1020.

The light source module 1000 may selectively include all or a part of the optical barrier 1041, the first auxiliary optical barrier 1042 and the second auxiliary optical barrier 1043, and the entirety or a part of each component may be defined as an optical barrier.

Figure 27:
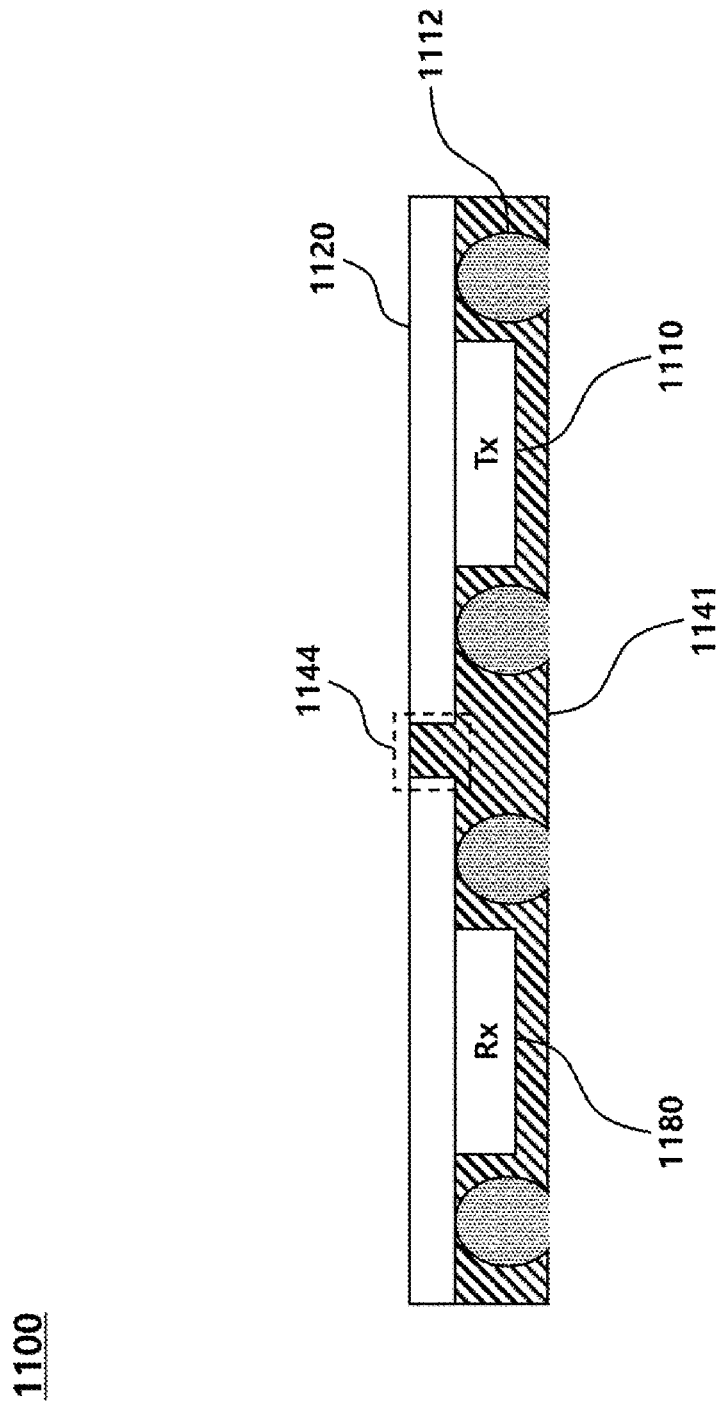
FIG. 27 is a view illustrating an optical barrier of an optical device in accordance with an embodiment.

FIG. 27 is a view illustrating an optical barrier of an optical device in accordance with an embodiment.

Figure 28:
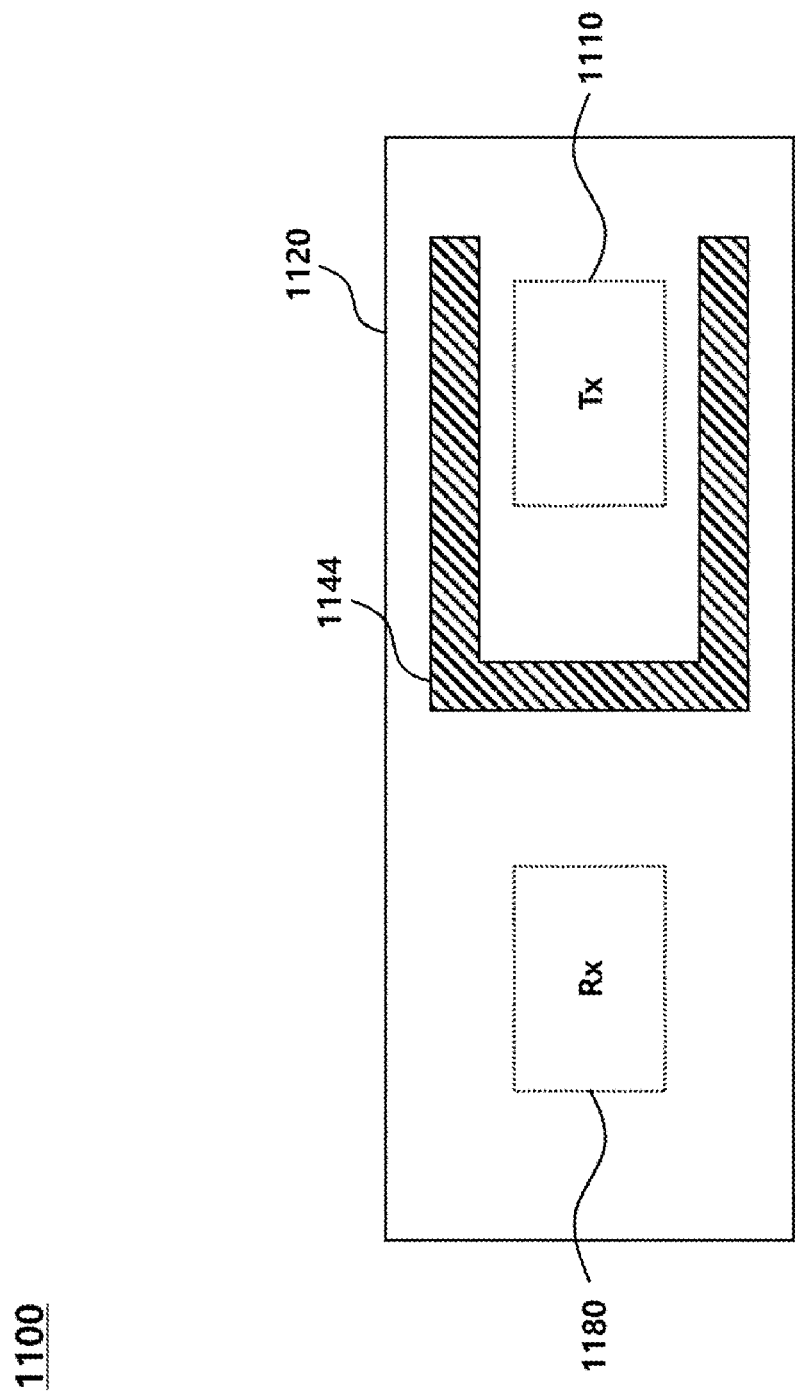
FIG. 28 is a top view illustrating a position of the optical barrier of the optical device in accordance with the embodiment.

FIG. 28 is a top view illustrating a position of the optical barrier of the optical device in accordance with the embodiment.

Referring to FIGS. 27 and 28, a light source module 1100 may include a light source 1110, solder balls 1112, an optical device 1120, a light blocking material 1141, and an optical sensor 1180.

The light source module 1100 may be implemented in the form of a system-in-package (SiP), and may have a structure in which the light source 1110, the optical device 1120 and the optical sensor 1180 are combined into one package.

The light source 1110 is to emit light, and may be attached to the surface of the optical device 1120 or be formed to be separated from the optical device 1120 by a predetermined distance.

The optical device 1120 may transmit light transferred from the light source 1110, and may transfer light, reflected by a subject, to the optical sensor 1180. As the optical device 1120, a single optical device may be used, and even in this case, noise may be caused in image or distance measurement by internal optical paths in the optical device 1120.

In this case, the light source module 1100 may reduce noise generation by forming the optical barrier of FIGS. 9 and 10 described above.

The packaging of the light source module 1100 may be completed by sequentially performing step of preparing the optical device 1120, step of coupling or disposing the light source 1110 or the optical sensor 1180, step of preparing the solder balls 1112 and step of providing the light blocking material 1141, but the order and method thereof are not limited thereto.

At the step of preparing the optical device 1120, a hole or a groove of the optical device 1120 may be formed. In this case, an optical barrier 1144 may be formed by first introducing the light blocking material 1141 into the hole or the groove and then curing the light blocking material 1141. However, the optical barrier 1144 may be formed by providing the light blocking material 1141 at last step.

At the step of preparing the solder balls 1112, the solder balls 1112 may be provided for electrical connection between a substrate (not illustrated) and the light source 1110 or the optical sensor 1180.

At the step of providing the light blocking material 1141, the light blocking material 1141 may be provided to the package of the light source module 1100. The light blocking material 1141 may be a polymer or resin capable of blocking light of a predetermined wavelength band, but is not limited thereto. When the light blocking material 1141 is not provided in the hole or groove of the optical device 1120, the optical blocking material 1141 may be provided at this step to form the optical barrier 1144. In this case, since the optical barrier 1144 may be provided through one process, the manufacturing process may be more simplified.

After the light blocking material 1141 is provided, packaging may be completed by cutting the shapes of the light blocking material 1141 and the solder balls 1112.

The optical barrier 1144 may have a shape surrounding a transmitter of a light source module as illustrated in FIG. 12, but the structure and shape of the optical barrier 1144 are not limited thereto as long as the optical barrier 1144 may block light through a space between the transmitter and a receiver of the light source module.

What is claimed is:

1. A light source module comprising:
    a substrate;
    an optical sensor disposed on the substrate and configured to receive light transferred from a light source;
    a lens assembly configured to transmit light, transferred from the light source, so as to transfer the light to the optical sensor;
    an optical barrier configured to block light transferred from the light source;
    wherein a light transmission layer is formed between the optical barrier and the optical sensor, and
    a side fill, which blocks light of a predetermined wavelength band, is applied to a path through which light is transferred to the light transmission layer.

2. The light source module according to claim 1, wherein the optical barrier is disposed on an open surface of the optical sensor and is brought into contact with the lens assembly.

3. The light source module according to claim 1, further comprising:
    a side fill formed by applying and curing a liquid material such that wires, which bring the optical sensor and the substrate into electrical contact with each other, are immersed.

4. The light source module according to claim 1, wherein
    the optical barrier is installed on a surface on which the optical sensor and the substrate are not in contact with each other, and
    partial surfaces of the optical barrier and the optical sensor block light, transferred from the light source, by being in contact with a side fill which is formed by a polymer being cured.

5. The light source module according to claim 1, wherein
    the optical barrier is disposed on an upper part of the optical sensor, wherein a predetermined distance is formed between the substrate and a top end of the optical barrier, and
    a light blocking material, which is cured, is disposed against the substrate, the optical sensor, and the optical barrier to have a distance less than the distance from the substrate to the top end of the optical barrier and a thickness that gradually increases.

6. A light source module comprising:
    a substrate;
    an optical sensor disposed on the substrate and configured to receive light transferred from a light source;
    a lens assembly configured to transmit light, transferred from the light source, so as to transfer the light to the optical sensor; and
    an optical barrier configured to block light transferred from the light source;
    wherein an outer side surface of the optical barrier and an outer side surface of the optical sensor with respect to an optical axis of the optical sensor are coated with a light blocking material.

7. A light source module comprising:
    a substrate,
    an optical sensor disposed on the substrate and configured to receive light transferred from a light source;
    a lens assembly configured to transmit light, transferred from the light source, so as to transfer the light to the optical sensor, and
    an optical barrier configured to block light transferred from the light source;
    wherein a blocking sheet is additionally attached between the optical sensor and the substrate and the blocking sheet covers a metal pattern on a surface of the substrate.

8. The light source module according to claim 7, further comprising:
    a first blocking sheet attached to a first surface of the substrate; and
    a second blocking sheet attached to a surface opposite to the first surface of the substrate.

* * * * *